United States Patent
Ma et al.

(10) Patent No.: US 12,231,649 B2
(45) Date of Patent: Feb. 18, 2025

(54) INTER PREDICTION METHOD, ENCODER, DECODER AND STORAGE MEDIUM

(71) Applicant: GUANGDONG OPPO MOBILE TELECOMMUNICATIONS CORP., LTD., Guangdong (CN)

(72) Inventors: Yanzhuo Ma, Guangdong (CN); Junyan Huo, Guangdong (CN); Shuai Wan, Guangdong (CN); Fuzheng Yang, Guangdong (CN); Qihong Ran, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 171 days.

(21) Appl. No.: 17/958,420

(22) Filed: Oct. 2, 2022

(65) Prior Publication Data

US 2023/0080546 A1    Mar. 16, 2023

Related U.S. Application Data

(63) Continuation of application No. PCT/CN2020/083356, filed on Apr. 3, 2020.

(51) Int. Cl.
    *H04N 11/02*    (2006.01)
    *H04N 19/136*   (2014.01)
    (Continued)

(52) U.S. Cl.
    CPC ......... *H04N 19/136* (2014.11); *H04N 19/159* (2014.11); *H04N 19/176* (2014.11)

(58) Field of Classification Search
    CPC .................................................. H04N 19/136
    (Continued)

(56) References Cited

U.S. PATENT DOCUMENTS

| | | |
|---|---|---|
| 9,736,454 B2 | 8/2017 | Hannuksela et al. |
| 2015/0189272 A1 | 7/2015 | Peng et al. |
| | (Continued) | |

FOREIGN PATENT DOCUMENTS

| | | |
|---|---|---|
| CN | 101822056 B | 1/2013 |
| CN | 102763415 B | 9/2015 |
| | (Continued) | |

OTHER PUBLICATIONS

Joint Video Experts Team (JVET) of ITU-T SG 16 WP3 and ISO/IEC JTC 1/SC 29/WG 11, JVET-Q0339-r1, CE4-related: Adjustment of the distance on the GEO mode, Jan. 7-17, 2020. (9 pages).

(Continued)

*Primary Examiner* — Leron Beck
(74) *Attorney, Agent, or Firm* — Young Basile Hanlon & MacFarlane, P.C.

(57) ABSTRACT

Disclosed are an inter prediction method, encoder/decoder, and storage medium. The method includes: determining a prediction mode parameter of a current block; when the parameter indicates that a GPM is used for determining an inter prediction value of the current block, determining an angle and a distance corresponding to a dividing line in the current block, setting an angle index value and a distance index value to index serial numbers corresponding to the angle and the distance in a preset mapping table respectively; determining a value of shifting direction indicator of the current block, which is used for indicating shifting directions of different dividing lines of the current block at the angle, by using a preset model based on size information and the angle index value of the current block; performing inter prediction on the current block based on the value of shifting direction indicator and the distance index value.

13 Claims, 13 Drawing Sheets

(51) Int. Cl.
    *H04N 19/159* (2014.01)
    *H04N 19/176* (2014.01)
(58) Field of Classification Search
    USPC .................................. 375/240.01–240.29
    See application file for complete search history.

(56) References Cited

U.S. PATENT DOCUMENTS

2021/0051335 A1* 2/2021 Liao ............... H04N 19/503
2021/0144374 A1* 5/2021 Esenlik ............ H04N 19/119

FOREIGN PATENT DOCUMENTS

| | | |
|---|---|---|
| CN | 108293132 A | 7/2018 |
| TW | 202007161 A | 2/2020 |

OTHER PUBLICATIONS

Joint Video Experts Team (JVET) of ITU-T SG 16 WP3 and ISO/IEC JTC 1/SC 29/WG 11, JVET-Q2001-vD, Versatile Video Coding (Draft 8), Jan. 7-17, 2020. (509 pages).

Extended European Search Report for EP Application 20928250.8 mailed Mar. 30, 2023. (8 pages).
Huawei Technologies Co., Ltd, RWTH Aachen University; Non-CE4: Geometrical partitioning for inter blocks; Joint Video Experts Team of ITU-T SG 16 WP 3 and ISO/IEC JTC 1/SC 29/WG 11; JVET-O0489 v4; Jul. 3-12, 2019. (9 pages).
Huawei Technologies Co., Ltd, RWTH Aachen University; CE4: CE4-1.1, CE4-1.2 and CE4-1.14: Geometric Merge Mode (GEO); Joint Video Experts Team of ITU-T SG 16 WP 3 and ISO/IEC JTC 1/SC 29/WG 11; JVET-P0068-v2; Oct. 1-11, 2019. (7 pages).
MediaTek Inc.; CE4-related: Reducing GEO modes; Joint Video Experts Team of ITU-T SG 16 WP 3 and ISO/IEC JTC 1/SC 29/WG 11; JVET-Q0189-v2; Jan. 7-17, 2020. (6 pages).
Editors; Versatile Video Coding (Draft 8); Joint Video Experts Team of ITU-T SG 16 WP 3 and ISO/IEC JTC 1/SC 29/ WG 11; JVET-Q2001-v8; Jan. 7-17, 2020. (501 pages).
International Search Report and Written Opinion with English Translation for PCT Application PCT/CN2020/083356 mailed Jan. 4, 2021. (14 pages).
Versatile video coding; Series H: Audiovisual and Multimedia Systems Infrastructure of audiovisual services—Coding of moving video; Recommendation ITU-T H.266; Aug. 2020. (516 pages).
Taiwan First Office Action with English translation for TW Application No. 110109406, mailed May 7, 2024, 14 pages.

* cited by examiner

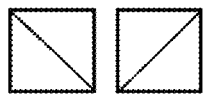
FIG. 1A
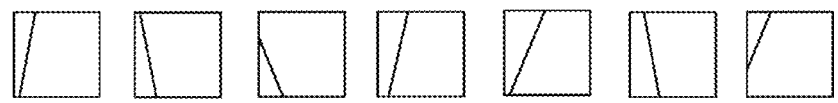
FIG. 1B
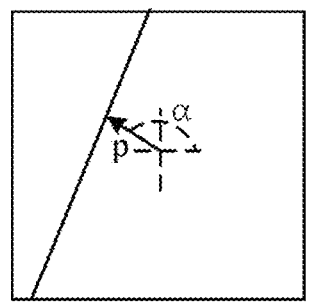
FIG. 2
FIG. 3A

| 8 | 8 | 8 | 8 | 8 | 8 | 6 | 4 | 2 | 0 | 0 | 0 | 0 | 0 | 0 | 0 |
|---|---|---|---|---|---|---|---|---|---|---|---|---|---|---|---|
| 8 | 8 | 8 | 8 | 8 | 8 | 7 | 5 | 2 | 0 | 0 | 0 | 0 | 0 | 0 | 0 |
| 8 | 8 | 8 | 8 | 8 | 8 | 7 | 5 | 3 | 1 | 0 | 0 | 0 | 0 | 0 | 0 |
| 8 | 8 | 8 | 8 | 8 | 8 | 7 | 5 | 3 | 1 | 0 | 0 | 0 | 0 | 0 | 0 |
| 8 | 8 | 8 | 8 | 8 | 8 | 8 | 6 | 4 | 2 | 0 | 0 | 0 | 0 | 0 | 0 |
| 8 | 8 | 8 | 8 | 8 | 8 | 8 | 6 | 4 | 2 | 0 | 0 | 0 | 0 | 0 | 0 |
| 8 | 8 | 8 | 8 | 8 | 8 | 8 | 7 | 5 | 3 | 1 | 0 | 0 | 0 | 0 | 0 |
| 8 | 8 | 8 | 8 | 8 | 8 | 8 | 7 | 5 | 3 | 1 | 0 | 0 | 0 | 0 | 0 |
| 8 | 8 | 8 | 8 | 8 | 8 | 8 | 7 | 5 | 3 | 1 | 0 | 0 | 0 | 0 | 0 |
| 8 | 8 | 8 | 8 | 8 | 8 | 8 | 8 | 6 | 3 | 1 | 0 | 0 | 0 | 0 | 0 |
| 8 | 8 | 8 | 8 | 8 | 8 | 8 | 8 | 6 | 4 | 2 | 0 | 0 | 0 | 0 | 0 |
| 8 | 8 | 8 | 8 | 8 | 8 | 8 | 8 | 6 | 4 | 2 | 0 | 0 | 0 | 0 | 0 |
| 8 | 8 | 8 | 8 | 8 | 8 | 8 | 8 | 7 | 5 | 3 | 1 | 0 | 0 | 0 | 0 |
| 8 | 8 | 8 | 8 | 8 | 8 | 8 | 8 | 7 | 5 | 3 | 1 | 0 | 0 | 0 | 0 |
| 8 | 8 | 8 | 8 | 8 | 8 | 8 | 8 | 8 | 6 | 3 | 1 | 0 | 0 | 0 | 0 |
| 8 | 8 | 8 | 8 | 8 | 8 | 8 | 8 | 8 | 6 | 4 | 2 | 0 | 0 | 0 | 0 |

FIG. 9A

|   |   |   |   |   |   |   |   |
|---|---|---|---|---|---|---|---|
| 8 | 8 | 8 | 6 | 2 | 0 | 0 | 0 |
| 8 | 8 | 8 | 7 | 3 | 0 | 0 | 0 |
| 8 | 8 | 8 | 8 | 4 | 0 | 0 | 0 |
| 8 | 8 | 8 | 8 | 5 | 1 | 0 | 0 |
| 8 | 8 | 8 | 8 | 5 | 1 | 0 | 0 |
| 8 | 8 | 8 | 8 | 6 | 2 | 0 | 0 |
| 8 | 8 | 8 | 8 | 7 | 3 | 0 | 0 |
| 8 | 8 | 8 | 8 | 8 | 3 | 0 | 0 |

INTER PREDICTION METHOD, ENCODER, DECODER AND STORAGE MEDIUM

CROSS-REFERENCE TO RELATED APPLICATION(S)

The present application is a continuation application of International PCT Application No. PCT/CN2020/083356, filed on Apr. 3, 2020, the entire content of which is hereby incorporated by reference.

TECHNICAL FIELD

Implementations of the present disclosure relate to the technical field of video encoding and decoding, and in particular to a method for inter predication, an encoder, a decoder, and a storage medium.

BACKGROUND

In the field of video encoding and decoding, in addition to intra prediction, inter prediction may also be used during encoding and decoding of a current block. Specifically, the inter prediction may be Geometrical partitioning for inter blocks (GEO), also known as a GPM prediction mode. Wherein, an inter current block is partitioned into two non-rectangular partitions, which are predicted respectively and then weighted and merged, to obtain a prediction value of the current block.

However, the current block of each size corresponds to dividing lines in 2-4 distances at different angles, and the dividing lines in several different distances are obtained according to movement of the current block in a corresponding direction and an offset distance associated with a distance index. Studies have found that there are many comparisons involved in an existing calculation process, which makes a high calculation complexity. Moreover, for angles with angle indexes of 2, 18, 14, 30, 3, 19, 13 and 29, there exists unreasonable distribution of dividing lines in a corresponding current block, for example, an extreme dense distance between dividing lines moving in the vertical direction in different distances leads to performance loss at the current angle and reduces a codec efficiency.

SUMMARY

Implementations of the present disclosure provide an method for inter prediction, an encoder, a decoder and a storage medium, which can simplify a calculation process, reduce a calculation complexity, and simultaneously solve a problem of performance loss caused by extreme dense distribution of the dividing lines in the GPM prediction mode.

Technical solutions of the implementations of the present disclosure may be implemented as follows.

In a first aspect, a method for inter prediction is provided according to an implementation of the present disclosure, which is applied to an encoder and includes:
 determining a prediction mode parameter of a current block;
 when the prediction mode parameter indicates that a Geometrical Partitioning Mode (GPM) is used to determine an inter prediction value of the current block, determining an angle and a distance corresponding to a dividing line in the current block, and setting an angle index value and a distance index value to index serial numbers corresponding to the angle and the distance in a preset mapping table respectively;
 calculating and determining a value of a shifting direction indicator of the current block by using a preset model based on size information and the angle index value of the current block, wherein, the value of a shifting direction indicator is used to indicate shifting directions of different dividing lines of the current block at the angle; and
 performing inter prediction on the current block based on the value of a shifting direction indicator and the distance index value.

In a second aspect, a method for inter prediction is provided according to an implementation of the present disclosure, which is applied to a decoder and includes:
 decoding a bitstream to obtain a prediction mode parameter of a current block;
 when the prediction mode parameter of the current block indicates that a Geometrical Partition Mode (GPM) is used for determining an inter prediction value of the current block, determining an angle index value and a distance index value, wherein, the angle index value and the distance index value represent index serial numbers corresponding to an angle and a distance corresponding to a dividing line in the current block in a preset mapping table;
 determining a value of a shifting direction indicator of the current block by using a preset model based on size information and the angle index value of the current block, wherein, the value of a shifting direction indicator is used to indicate shifting direction of different dividing lines of the current block at the angle; and
 determining the inter prediction value of the current block based on the value of a shifting direction indicator and the distance index value.

In a third aspect, an encoder is provided according to an implementation of the present disclosure, which includes a first determination unit, a first calculation unit and a first prediction unit.

The first determination unit is configured to determine a prediction mode parameter of a current block.

The first determination unit is further configured to, when the prediction mode parameter indicates that a Geometrical Partition Mode (GPM) is used to determine an inter prediction value of the current block, determine an angle and a distance corresponding to a dividing line in the current block, and set, respectively, an angle index value and a distance index value to index serial numbers corresponding to the angle and the distance in a preset mapping table.

The first calculation unit is configured to determine a value of a shifting direction indicator of the current block by using a preset model based on size information and the angle index value of the current block, wherein, the value of a shifting direction indicator is used to indicate shifting directions of different dividing lines of the current block at the angle.

The first prediction unit is configured to perform inter prediction on the current block based on the value of a shifting direction indicator and the distance index value.

In a fourth aspect, an encoder is provided according to an implementation of the present disclosure, which includes a first memory and a first processor.

The first memory is configured to store a computer program runnable on the first processor.

The first processor is configured to perform the method according to the first aspect when running the computer program.

In a fifth aspect, a decoder is provided according to an implementation of the present disclosure, which includes a decoding unit, a second determination unit, a second calculation unit, and a second prediction unit.

The decoding unit is configured to decode a bitstream to obtain a prediction mode parameter of a current block.

The second determining unit configured to, when a prediction mode parameter of the current block indicates that a Geometrical Partition Mode (GPM) is used for determining an inter prediction value of the current block, determine an angle index value and a distance index value, wherein, the angle index value and the distance index value represent index serial numbers corresponding to an angle and a distance corresponding to a dividing line in the current block in a preset mapping table.

The second calculation unit is configured to determine a value of a shifting direction indicator of the current block by using a preset model based on size information and the angle index value of the current block, wherein, the value of a shifting direction indicator is used to indicate shifting directions of different dividing lines of the current block at the angle.

The second prediction unit is configured to determine the inter prediction value of the current block based on the value of a shifting direction indicator and the distance index value.

In a sixth aspect, a decoder is provided according to an implementation of the present disclosure, which includes a second memory and a second processor.

The second memory is configured to store a computer program runnable on the second processor.

The second processor is configured to perform the method according to the second aspect when running the computer program.

In a seventh aspect, a computer storage medium in which a computer program is stored is provided according to an implementation of the present disclosure, wherein when the computer program is executed by a first processor, the method according to the first aspect is implemented, or when the computer program is executed by a second processor, the method according to the second aspect is implemented.

A method for inter prediction, an encoder, a decoder, and a storage medium are provided in the implementations of the present disclosure. Applied to an encoder, the method includes: determining a prediction mode parameter of the current block; when the prediction mode parameter indicates that a geometrical partitioning prediction mode (GPM) is used to determine an inter prediction value of the current block, determining an angle and a distance corresponding to a division line in the current block, and setting an angle index value and a distance index value to be index serial numbers corresponding to the angle and the distance in a preset mapping table respectively; determining, on the basis of size information of the current block and the angle index value, a value of a shifting direction indicator of the current block by using a preset model, wherein the value of a shifting direction indicator is used for indicating shifting directions of different division lines of current block at the angle; and performing inter prediction on the current block on the basis of the value of a shifting direction indicator and the distance index value. A method for inter prediction, applied to a decoder, includes: decoding a bitstream to obtain a prediction mode parameter of the current block; when the prediction mode parameter indicates that a GPM is used for determining an inter prediction value of the current block, determining an angle index value and a distance index value, wherein, the angle index value and the distance index value represent index serial numbers corresponding to an angle and a distance corresponding to a dividing line in the current block in a preset mapping table; determining a value of a shifting direction indicator of the current block by using a preset model based on size information and the angle index value of the current block, wherein, the value of a shifting direction indicator is used to indicate shifting directions of different dividing lines of the current block at the angle; and determining the inter prediction value of the current block based on the value of a shifting direction indicator and the distance index value. In this way, a calculation process for the value of a shifting direction indicator is simplified by using the preset model, and the calculation complexity is reduced. In addition, moving directions of dividing lines in the block with different sizes at partial angles in the GPM prediction mode can be refined, which leads to more uniform and sparse distribution of the dividing lines in all block sizes, and a problem of performance loss caused by extreme dense distribution of the dividing lines under the GPM prediction mode is solved, thus improving the codec performance and achieving a purpose of improving the codec efficiency.

BRIEF DESCRIPTION OF DRAWINGS

FIG. 1A is a schematic diagram of a structure of a geometrical partition mode provided according to a related technical solution.

FIG. 1B is a schematic diagram of a structure of another geometrical partition mode provided according to a related technical solution.

FIG. 2 is a schematic diagram of a structure of an angle and a distance of a current block provided according to a related technical solution.

FIGS. 3A, 3B and 3C are schematic diagrams of spacing between dividing lines at different angles of a GPM prediction mode provided according to a related technical solution, respectively.

FIG. 9A is a schematic diagram of a luminance weight matrix of a current block provided according to an implementation of the present disclosure.

FIG. 9B is a schematic diagram of a chrominance weight matrix of a current block provided according to an implementation of the present disclosure.

Figures 10B, 11A, 11B:
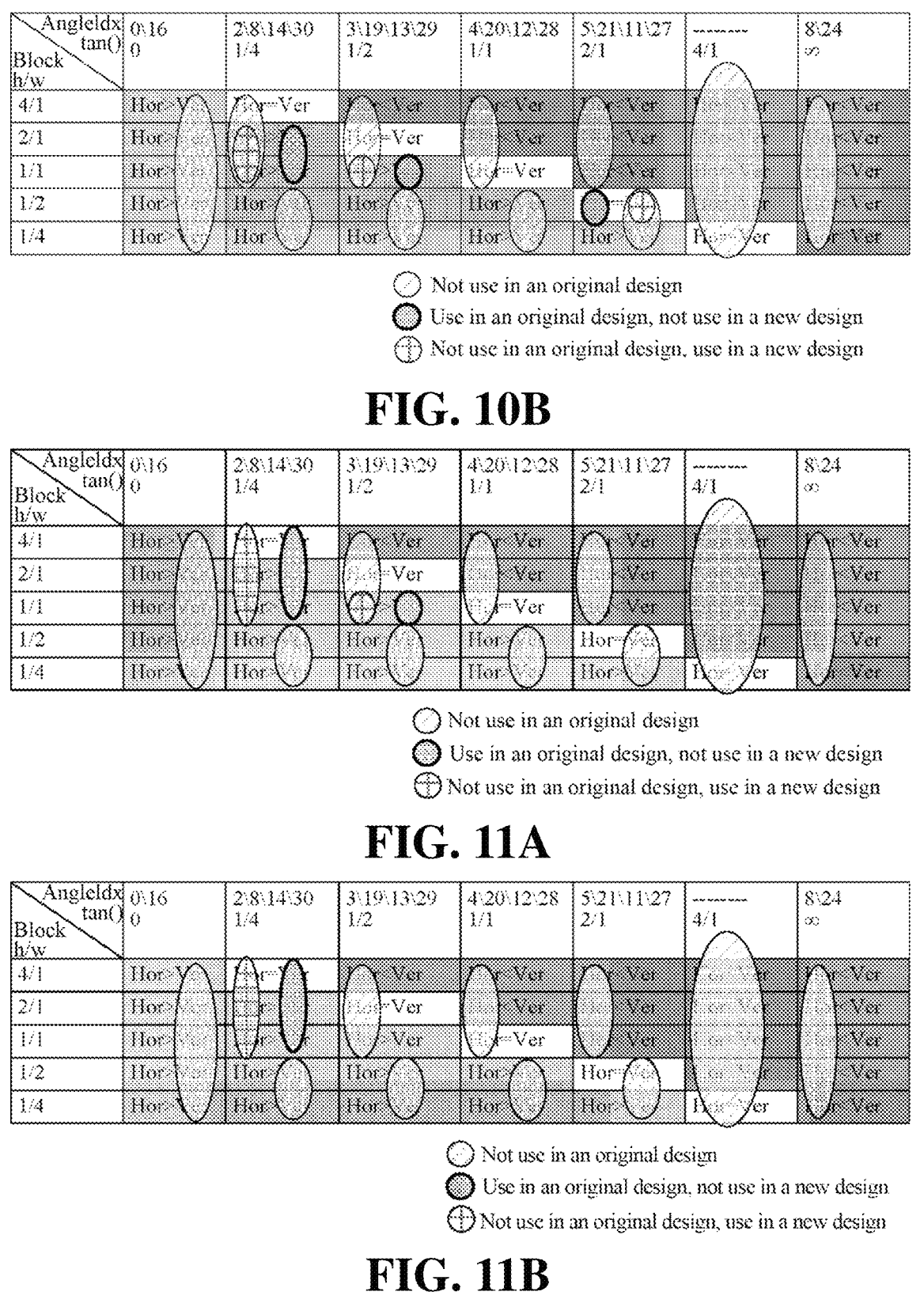

FIG. 10A is a schematic diagram of a correspondence between a block size, an angle index value, and a dividing line moving direction provided according to a related technical solution.

FIG. 10B is a schematic diagram of a correspondence between a block size, an angle index value, and a dividing line moving direction provided according to an implementation of the present disclosure.

FIG. 11A is a schematic diagram of another correspondence between a block size, an angle index value, and a dividing line moving direction provided according to an implementation of the present disclosure.

FIG. 11B is a schematic diagram of yet another correspondence between a block size, an angle index value, and a dividing line moving direction provided according to an implementation of the present disclosure is shown.

DETAILED DESCRIPTION

Figure 4A:
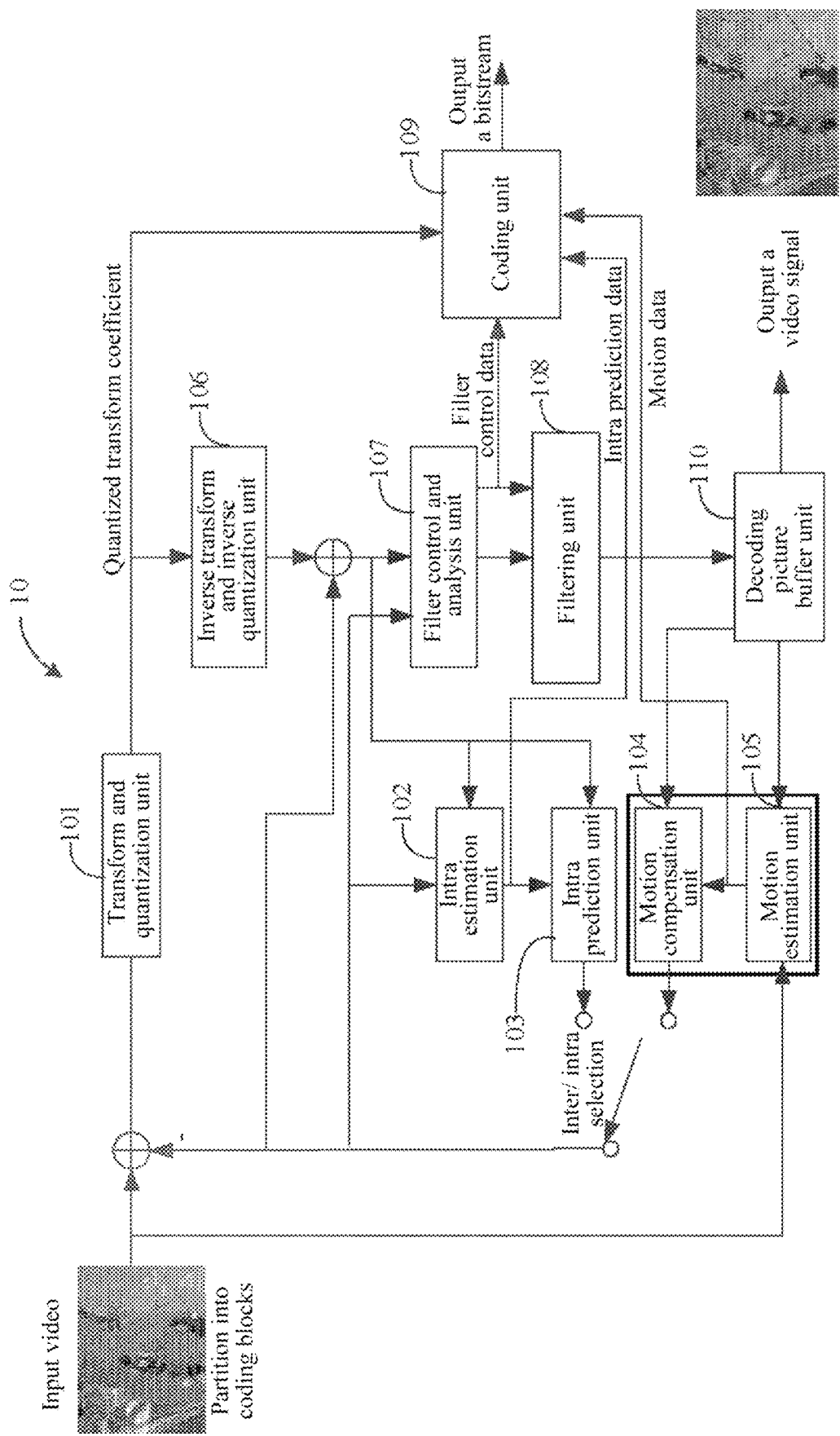
FIG. 4A is a block diagram of a composition of a video encoding system provided according to an implementation of the present disclosure.

In order to understand features and technical contents of implementations of the present disclosure in more detail, realization of the implementations of the present disclosure will be described in detail below in combination with the accompanying drawings, the accompanying drawings are for reference only but are not intended to limit the implementations of the present disclosure.

In a video picture, a Coding Block (CB) is generally characterized by a first colour component, a second colour component, and a third colour component. These three colour components are a luma component, a blue chroma component, and a red chroma component respectively. Specifically, the luma component is usually denoted by a symbol Y, the blue chroma component is usually denoted by a symbol Cb or U, and the red chroma component is usually represented by a symbol Cr or V. In this way, the video picture may be expressed in YCbCr format or YUV format.

In an implementation of the present disclosure, the first colour component may be a luma component, the second colour component may be a blue chroma component, and the third colour component may be a red chroma component, which is not specifically restricted in implementations of the present disclosure.

A related technical solution with regard to Geometrical Partition Mode (GPM) will be described below.

In a hybrid framework of video coding, coding techniques such as prediction, transformation and quantization, etc., are usually implemented only in square and rectangular blocks. However, in a practical application, an edge of a moving object is not necessarily horizontal or vertical; even so, it is not necessarily just on the edge of a partitioned block. Because motion vectors on both sides of a moving edge are often different, it is prone to a large prediction error when motion prediction and compensation is performed with respect to a whole block in a coding process, leading to a limited coding efficiency.

In a making process of a new generation video coding standard H.266/Versatile Video Coding (VVC), other shape partitioning besides square and rectangle is introduced. Firstly, Triangular Partition Mode (TPM), shown in FIG. 1A, is introduced. In FIG. 1A, a diagonal or a back-diagonal of a square or rectangle is used as a dividing line to obtain a triangular prediction unit, so that inter prediction data can be represented more flexibly, thereby the prediction error is reduced, and then the coding efficiency is improved.

At a conference of Joint Video Experts Team (JVET), a Geometric partitioning for inter blocks (GEO), which is more flexible than the TPM, was proposed. After that, the JVET officially adopted GEO prediction mode into the VVC and renamed it as GPM. Specifically, in the GPM prediction technique, one inter block is partitioned into two non-rectangular sub-partitions with a more flexible representation method for an edge portion of a moving object in a picture, as shown in FIG. 1B. Prediction is performed on the two sub-partitions obtained after partitioning respectively, and then weighted merge is performed to get an inter prediction value of the current block.

It should also be noted that in a current VVC, the GPM prediction technique can have 64 partition modes in total, and each of which corresponds to an angle (denoted by a) and a distance (denoted by p), that is, there can be a total of 20 angles and 4 distances. As shown in FIG. 2, an angle obtained by rotating counter-clockwise from a horizontal direction to a position of a normal line of the dividing line is a, and a normal distance of the dividing line is p; herein, each combination of the angle and the distance can form a partition mode. In the GPM prediction mode, according to a partition mode, the current block is partitioned into two non-rectangular sub-partitions, and unidirectional motion compensation is performed on each sub-partition separately to get a unidirectional prediction value. Finally, the weighted merge is performed on the unidirectional prediction values of the two sub-partitions by a weight matrix to get a final GPM prediction value.

Figures 3B, 3C:
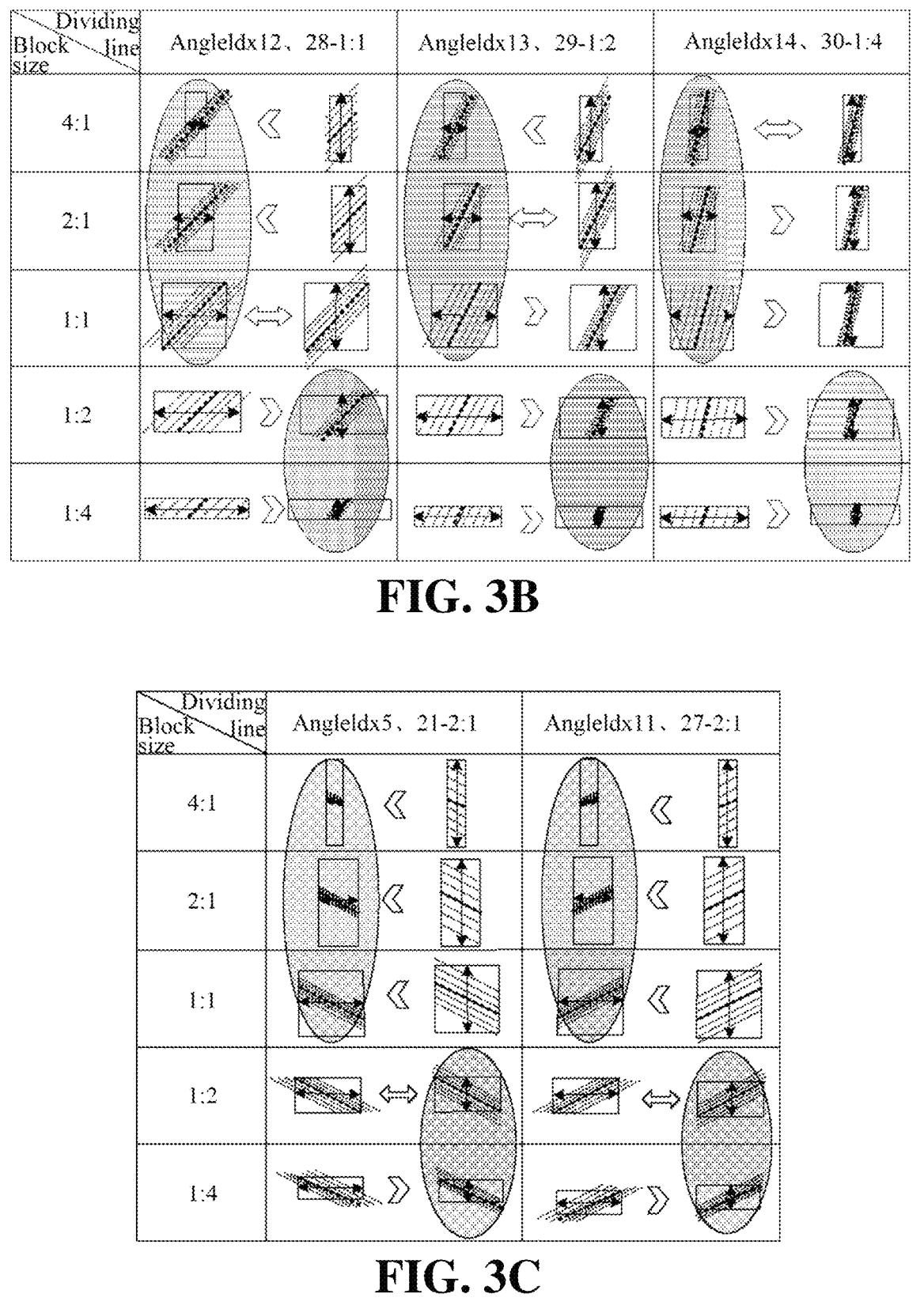

In a practical application, it's necessary to obtain a corresponding weight matrix by a certain offset value for a prediction process of each current block, and for the calculation of the offset value, it is needed to judge whether an offset in horizontal direction (i.e. in an X-axis direction) or an offset in vertical direction (i.e. in a Y-axis direction) is needed according to an angle of the current block, and a specific offset distance depends on a width (i.e. in the X-axis direction) or a height (i.e. in the Y-axis direction) of the current block and a distance index value of the current block. Because a current block of each size has its own dividing lines in corresponding 2-4 distances at different angles, dividing lines in different distances are obtained by shifting the current block in a corresponding direction by a corresponding offset distance. However, by studying dividing lines in different distances for all block sizes and at all angles, it can be found that, for angles with angle index values of 2, 18, 14 and 30, distances of dividing lines in different distances obtained by moving all corresponding block sizes in the vertical direction are extremely dense, thus performances of modes with these several distances at a current angle are equivalent, and extra mode bits are also occupied. Meanwhile, at angles corresponding to the angle index values of 3, 19, 13 and 29, for squares and blocks whose height is less than the width, distribution between dividing lines moved in the vertical direction is too dense, while distribution between dividing lines moved in the horizontal direction is relatively uniform and sparse. As shown in FIGS. 3A, 3B, and 3C, schematic diagrams of spacing between dividing lines of the GPM prediction mode at different angles are provided. There are five block sizes, including 4:1, 2:1, 1:1, 1:2 and 1:4, and there are a plurality of angle index values, including 2, 18, 3, 19, 4, 20, 5, 21, 11, 27, 12, 28, 13, 29, 14 and 30, etc. In each box, a horizontal movement direction is indicated at a left side, a vertical movement direction is indicated at a right side, " " indicates that a horizontal movement spacing is greater than a vertical movement spacing, " " indicates that the horizontal movement spacing is less than the vertical movement spacing, " " indicates that the horizontal movement spacing is approximately equal to the vertical movement spacing, and a gray ellipse coverage part indicates a case which is not adopted in an original solution. As can be seen in FIGS. 3A, 3B and 3C, if the dividing line in the current block is shifted in the vertical direction, that is, for all block sizes with angle index values of 8 and 24 corresponding to a horizontal dividing angle (a normal line is perpendicular), and blocks whose heights are greater than or equal to their widths at the remaining angles, then it is shifted by a distance which is related to the height and the distance index value, only in the vertical direction; if the dividing line in the current block is shifted in the horizontal direction, for all block sizes with angle index values of 0 and 16 corresponding to a vertical dividing angle (the normal line is horizontal), and blocks whose widths are greater than or equal to their heights at the remaining angles, then it is shifted by a distance which is related to the width and the distance index value only in horizontal direction, and finally a dividing line with an angle and a distance index corresponding to the current block can be obtained.

According to the above principle analysis with reference to FIGS. 3A, 3B and 3C, for the angles corresponding to angle index values of 2, 18, 14, 30, 3, 19, 13 and 29, there is a unreasonable condition that the distances of dividing lines are extreme dense, which leads to performance loss at the current angle. In addition, there are many comparisons involved in the original solution, and "bit AND" and "bit OR" operators are used, which leads to a high computation complexity and reduces a codec efficiency.

A method for inter prediction is provided according to an implementation of the present disclosure, which is applied to an encoder or a decoder. When a prediction mode parameter of the current block indicates that the Geometrical Partition Mode (GPM) is used for determining the inter prediction value of the current block, an angle and a distance corresponding to the dividing line in the current block are determined, and an angle index value and a distance index value are respectively set to index serial numbers corresponding to the angle and the distance in a preset mapping table; based on size information of the current block and the angle index value, a value of a shifting direction indicator of the current block is determined by a preset model, wherein, the value of a shifting direction indicator is used for indicating shifting directions of different dividing lines of the current block at the angles; based on the value of a shifting direction indicator and the distance index value, an inter prediction value for the current block is determined. In this way, a calculation process for a value of a shifting direction indicator is simplified by using the preset model, and the calculation complexity is reduced. In addition, moving directions of dividing lines in the block with different sizes at partial angles in the GPM prediction mode can be refined, which leads to more uniform and sparse distribution of the dividing lines in all block sizes, and a problem of performance loss caused by extreme dense distribution of the dividing lines under the GPM prediction mode is solved, thus improving the codec performance and achieving a purpose of improving the codec efficiency.

Various implementations of the present disclosure will be described in detail below with reference to the accompanying drawings.

Referring to FIG. 4A, an example of a block diagram of a composition of a video encoding system provided according to an implementation of the present disclosure is shown. As shown in FIG. 4A, the video encoding system 10 includes a transform and quantization unit 101, an intra estimation unit 102, an intra prediction unit 103, a motion compensation unit 104, a motion estimation unit 105, an inverse transform and inverse quantization unit 106, a filter control and analysis unit 107, a filtering unit 108, a coding unit 109, and a decoding picture buffer unit 110, etc. Herein, the filtering unit 108 may implement deblocking filtering and Sample Adaptive Offset (SAO) filtering, and the coding unit 109 may implement header information coding and Context-based Adaptive Binary Arithmetic Coding (CABAC). For an input original video signal, a video coding block can be obtained by partitioning the Coding Tree Unit (CTU), and then residual pixel information obtained by the intra or inter prediction is transformed by the transform and quantization unit 101 for the video coding block, including transforming the residual information from the pixel domain to the transform domain, and quantizing the obtained transform coefficient to further reduce the bit rate. The intra estimation unit 102 and the intra prediction unit 103 are used for intra prediction of the video coding block. Specifically, the intra estimation unit 102 and the intra prediction unit 103 are used to determine an intra prediction mode to be used to encode the video coding block. The motion compensation unit 104 and the motion estimation unit 105 are used to perform inter prediction coding of the received video coding block with respect to one or more blocks in one or more reference pictures to provide temporal prediction information; the motion estimation performed by the motion estimation unit 105 is a process of generating a motion vector that can estimate the motion of the video coding block, and then the motion compensation unit 104 performs motion compensation based on the motion vector determined by the motion estimation unit 105. After determining the intra prediction mode, the intra prediction unit 103 is further used to provide the selected intra prediction data to the encoding unit 109, and the motion estimation unit 105 also sends the calculated and determined motion vector data to the encoding unit 109. In addition, the inverse transform and inverse quantization unit 106 is used for reconstructing the video coding block, residual blocks are reconstructed in the pixel domain, for the reconstructed residual blocks, the blockiness artifacts are removed through the filter controlling and analyzing unit 107 and the filter unit 108, and then the reconstructed residual blocks are added to a prediction block in a frame of the decoding picture buffer unit 110 to generate reconstructed video coding blocks. The encoding unit 109 is used to encode various encoding parameters and quantized transform coefficients. In a CABAC-based encoding algorithm, the context content can be based on adjacent encoding blocks, and can be used to encode information indicating the determined intra prediction mode and output the bitstream of the video signal. The decoding picture buffer unit 110 is used to store reconstructed video coding blocks for prediction reference. As video picture encoding progresses, new reconstructed video coding blocks will be generated continuously, and these reconstructed video coding blocks will be stored in the decoding picture buffer unit 110.

Figure 4B:
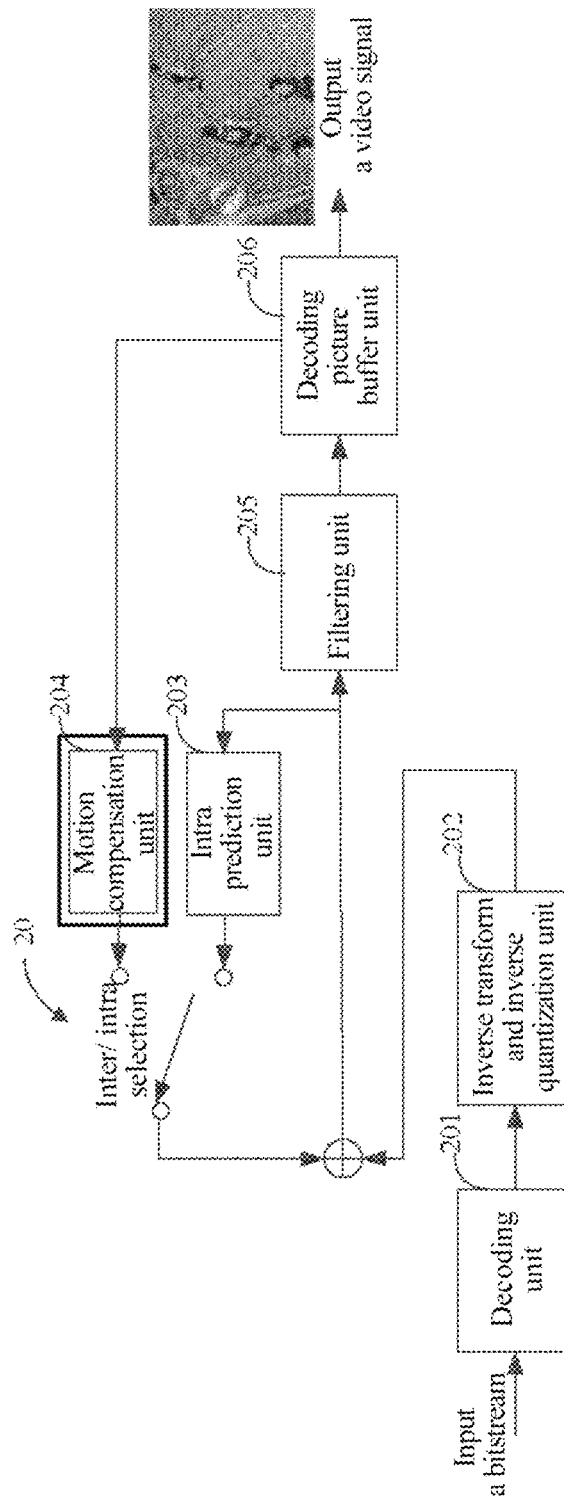
FIG. 4B is a block diagram of a composition of a video decoding system provided according to an implementation of the present disclosure.

Referring to FIG. 4B, an example of a block diagram of a composition of a video decoding system provided according to an implementation of the present disclosure is shown. As shown in FIG. 4B, the video decoding system 20 includes a decoding unit 201, an inverse transform and inverse quantization unit 202, an intra prediction unit 203, a motion compensation unit 204, a filtering unit 205, and a decoding picture buffer unit 206, etc. Herein, the decoding unit 201 may implement header information decoding and CABAC decoding, and the filtering unit 205 may implement deblocking filtering and SAO filtering. After the input video signal is encoded shown in FIG. 4A, the bitstream of the video signal is output. When the bitstream is input into the video decoding system 20, the bitstream first passes through the decoding unit 201 to obtain the decoded transform coefficients; the transform coefficients are processed by the inverse transform and inverse quantization unit 202 to generate residual blocks in the pixel domain. The intra prediction unit 203 may be used to generate prediction data of the current video decoding block based on the determined intra prediction mode and data from the previously decoded block of the current frame or picture. The motion compensation unit 204 determines the prediction information for the video decoding block by analyzing the motion vector and other related syntax elements, and uses the prediction information to generate the prediction block of the video decoding block which is currently being decoded. A decoded video block is formed by summing the residual block from the inverse transform and inverse quantization unit 202 with the corresponding prediction block generated by the intra prediction unit 203 or the motion compensation unit 204. The decoded video signal passes through the filtering unit 205 to remove blockiness artifacts, which may improve the video quality. Then, the decoded video block is stored in the decoding picture buffer unit 206, the decoding picture buffer unit 206 stores the reference picture for subsequent intra prediction or motion compensation, and also for video signal output, thus obtaining a restored original video signal.

The method for inter prediction in an implementation of the present disclosure may be applied to an inter prediction portion of the motion compensation unit 104 and the motion estimation unit 105 shown in FIG. 4A, or to the inter prediction portion of the motion compensation unit 204 shown in FIG. 4B. That is to say, the method for inter prediction in an implementation of the present disclosure may be applied to the video encoding system or the video decoding system, or may even be applied to the video encoding system and the video decoding system at the same time, which is not specifically restricted in implementations of the present disclosure. It should also be noted that when the method for inter prediction is applied to the inter prediction portion shown in FIG. 4A, the "current block" specifically refers to a current coding block in the inter prediction; when the method for inter prediction is applied to the inter prediction portion shown in FIG. 4B, the "current block" specifically refers to a current decoding block in the inter prediction.

Figure 5:
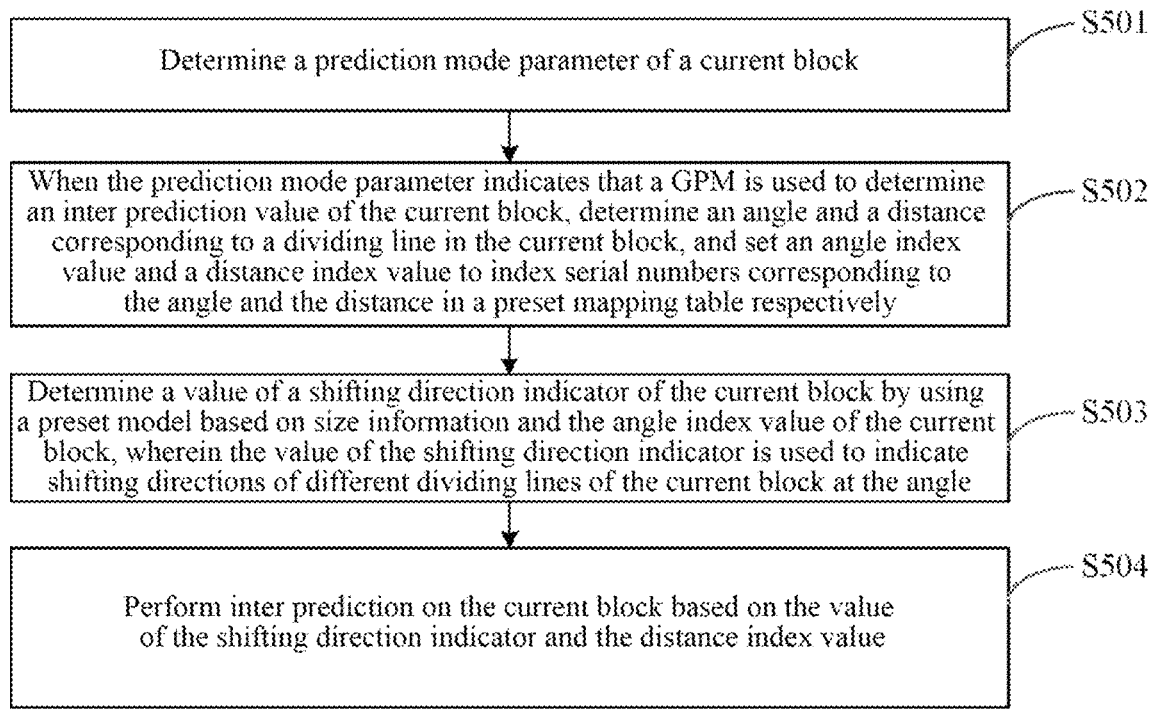
FIG. 5 is a flowchart of a method for inter prediction provided according to an implementation of the present disclosure.

Based on an example of an application scenario of FIG. 4A above, referring to FIG. 5, it shows a flowchart of a method for inter prediction provided according to an implementation of the present disclosure. As shown in FIG. 5, the method may include the following acts S501 to S504.

In act S501, a prediction mode parameter of a current block is determined.

It should be noted that a video picture may be partitioned into a plurality of picture blocks, and each picture block to be encoded currently may be referred to as a Coding Block (CB). Herein, each coding block may include a first colour component, a second colour component, and a third colour component. The current block is a coding block of which a first colour component, a second colour component, or a third colour component is to be predicted currently, in the video picture.

Herein, it is assumed that a first colour component is predicted for a current block, and the first colour component is a luma component, that is, a colour component to be predicted is a luma component, and then the current block may also be referred to as a luma block. Or, it is assumed that a second colour component is predicted for a current block, and the second colour component is a chroma component, that is, a colour component to be predicted is a chroma component, then the current block may also be referred to as a chroma block.

It should also be noted that the prediction mode parameter indicates a prediction mode of the current block and a parameter related to the prediction mode. Herein, a simple decision strategy, such as determination based on a distortion value, can be employed to determine the prediction mode parameter; complex decision strategies, such as determination based on the results of Rate Distortion Optimization (RDO), may also be employed, which is not restricted in implementations of the present disclosure. Generally speaking, RDO can be employed to determine the prediction mode parameter of the current block.

Specifically, in some implementations, for the act S501, determining the prediction mode parameter of the current block may include:
performing precoding on the current block by using a plurality of prediction modes to obtain a rate distortion cost value corresponding to each prediction mode;
selecting a minimum rate distortion cost value from the plurality of obtained rate distortion cost values, and determining a prediction mode corresponding to the minimum rate distortion cost value as the prediction mode parameter of the current block.

That is to say, on an encoder side, for the current block, a plurality of prediction modes may be employed to perform precoding on the current block respectively. Herein, the plurality of prediction modes usually include an inter prediction mode, a traditional intra prediction mode and a non-traditional intra prediction mode. The traditional intra prediction mode may include a Direct Current (DC) mode, a PLANAR mode and an angle mode, etc.; the non-traditional intra prediction mode may include a Matrix-based Intra Prediction (MIP) mode, a Cross-component Linear Model prediction (CCLM) mode, an Intra Block Copy (IBC) mode, and a palette (PLT) mode, etc. Inter prediction modes may include a traditional inter prediction mode and a GPM prediction mode, etc.

Therefore, after precoding is performed on the current block by using the plurality of prediction modes respectively, a rate distortion cost value corresponding to each of the plurality of prediction modes may be obtained; and then the minimum rate distortion cost value is selected from the plurality of obtained rate distortion cost values, and the prediction mode corresponding to the minimum rate distortion cost value is determined as the prediction mode parameter of the current block. In addition, after precoding is performed on the current block by using the plurality of prediction modes respectively, a distortion value corresponding to each of the plurality of prediction modes may be obtained, also; and then a minimum distortion value is selected from the plurality of obtained distortion values, and a prediction mode corresponding to the minimum distortion value is determined as the prediction mode parameter of the current block. In this way, the current block is finally encoded using the determined prediction mode parameter, and in this prediction mode, a prediction residual can be small, and the encoding efficiency can be improved.

In act S502, when the prediction mode parameter indicates that a GPM is used to determine an inter prediction value of the current block, an angle and a distance corresponding to a dividing line in the current block are determined, and an angle index value and a distance index value are set to index serial numbers corresponding to the angle and the distance in a preset mapping table respectively It should be noted that for the current block, if the current block can use the GPM prediction mode, then the current block needs to meet some limitations. Exemplarily, the limitations may include:
(a) a Sequence Parameter Set (SPS) allows to use the GPM prediction mode;
(b) an encoded picture region of the current block belongs to a bi-directional prediction slice (B slice);
(c) a size limitation for the current block, including that the width and the height must both be greater than or equal to 8 and less than or equal to 64, and a width-height ratio and a height-width ratio of the current block must both be less than 8;
(d) the current block is a non-general merge prediction, a non-merge_subblock prediction, a non-affine prediction, and a non-Composed Intra Inter Prediction (CIIP); and Further, in some implementations, when the prediction mode parameter indicates that the Geometrical Partition Mode (GPM) is used to determine an inter prediction value of the current block, the method may further include: determining a partition mode of the current block; and determining the index value of the partition mode to be the index serial number corresponding to the partition mode in the preset mapping table and signalling the index value in a bitstream, wherein, the preset mapping table is used to indicate a relationship between the partition mode index value, the angle index value and the distance index.

In other words, when it is determined that the prediction mode parameter indicates that the GPM is used for determining the inter prediction value of the current block, the partition mode of the current block can also be determined at this time, wherein, each partition mode corresponds to an angle and a distance. Generally speaking, there are 64 partition modes for GPM prediction mode, in view of so many partition modes, RDO still can be used to determine the partition mode of the current block, at the same time, the partition mode index value is determined to be the index serial number in the preset mapping table which corresponds to the partition mode and is signalled in the bitstream, so that the partition mode index value can be obtained by decoding the bitstream on a decoder side, and then the angle index value and the distance index value of the current block can be determined by searching the preset mapping table.

The preset mapping table for reflecting the partition mode index value, the angle index value and the distance index is shown in Table 1. In Table 1, a total of 64 partition modes and the angle index value and distance index value corresponding to each partition mode are provided. Herein, merge_gpmpartition_idx is the partition pattern index value, angleIdx is the angle index value, and distanceIdx is the distance index value.

TABLE 1

| | merge_gpm_partition_idx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

(e) disabling the GPM prediction mode for colour components in the 4:0:0 format.

It should also be noted that the angle and distance of the current block can be acquired or determined if the current block satisfies the above limitations and the prediction mode parameter indicates that the GPM is used to determine the inter prediction value of the current block. Herein, the angle index value and the distance index value are set to the index serial numbers corresponding to the angle and the distance in the preset mapping table respectively.

In act S503, a value of a shifting direction indicator of the current block is determined using a preset model based on size information and the angle index value of the current block, wherein, the value of a shifting direction indicator is used to indicate shifting directions of different dividing lines of the current block at the angle.

It should be noted that when the current block is determined, the size information of the current block, such as the height and the width of the current block, can be obtained.

In this way, according to the size information and the angle index value of the current block, a value of a shifting direction indicator of the current block can be calculated, which can be denoted by shiftHor.

Specifically, in some implementations, determining the value of a shifting direction indicator of the current block by using the preset model based on the size information and the angle index value of the current block in the act S503 may include:
- determining a first refinement value according to the angle index value;
- using the first refinement value to shift the height of the current block to obtain a shifted height;
- using a preset offset value to shift the width of the current block to obtain a shifted width;
- comparing the shifted height with the shifted width; and
- according to a result of comparison, obtaining a value of a shifting direction indicator of the current block.

Furthermore, in some implementations, determining the first refinement value according to the angle index value may include:
- using the angle index value to perform modulo operation on a third preset value to obtain a modulus result; and
- comparing the modulus result with a fourth preset value, and determining the first refinement value according to a result of comparison.

Herein, the preset offset value may be 4, the third preset value may be 16, and the fourth preset value may be 8. In addition, the size information of the current block may include the height and the width of the current block, the height of the current block is denoted by nH, the width of the current block is denoted by nW, and the angle index value of the current block is denoted by angleIdx; in this way, the first refinement value is calculated as follows.

$$\Delta shift = ((angleIdx\ \%16) > 8)?(16 - (angleIdx\ \%16)):(angleIdx\ \%16) \quad (1)$$

Wherein the "%" represents a modular operator. According to formula (1), if a modulus result of angleIdx %16 is greater than 8, the result of comparison is 16-angleIdx %16 i.e. the first refinement value; if the modulus result of angleIdx %16 is less than or equal to 8, the result of comparison is angleIdx %16, i.e. the first refinement value. It should be noted that for the formula (1), an equivalent form of the formula can be expressed as $\Delta shift = ((angleIdx\ \%16) >= 8)?(16 - (angleIdx\ \%16)):(angleIdx\ \%16)$, wich is not specifically restricted.

In this way, after the first refinement value is calculated, a calculation formula of the value of a shifting direction indicator (shiftHor) of the current block is shiftHor=(nH<<$\Delta$shift)<(nW<<4) that is:

$$shiftHor = (nH << (((angleIdx\ \%16) > 8)?(16 - (angleIdx\ \%16)):(angleIdx\ \%16))) < (nW << 4) \quad (2)$$

For formula (2), its equivalent form can also be expressed by the following formula, $$shiftHor = (nH << (((angleIdx\ \%16) >= 8)?(16 - (angleIdx\ \%16)):(angleIdx\ \%16))) < (nW << 4)$$

or, $$shiftHor = (nH << (((angleIdx\ \%16) > 8)?(16 - (angleIdx\ \%16)):(angleIdx\ \%16))) <= (nW << 4)$$

or, $$shiftHor = (nH << (((angleIdx\ \%16) >= 8)?(16 - (angleIdx\ \%16)):(angleIdx\ \%16))) <= (nW << 4) \quad (3)$$

In addition, for the formula (2), its equivalent form can also be split into the following two formulas, which are expressed as follows.

$$normalHwRatio = nH << (((angleIdx\ \%16) > 8)?(16 - (angleIdx\ \%16)):(angleIdx\ \%16))$$

$$shiftHor = normalHwRatio < (nW << 4)$$

Wherein, "<<" represents a left shift operator, for example, "<<$\Delta$shift" indicates an operation of left shifting $\Delta$shift bits based on binary.

No matter the formula (1), the formula (2) or the formula (3), there are many equivalent forms of these formulas, which is not specifically restricted in implementations of the present disclosure. Taking shiftHor=(nH<<$\Delta$shift)<(nW<<4) as an example, the equivalent form of this formula can also be expressed as shiftHor=(nH<<$\Delta$shift)<(nW<<4)?1:0; or, expressed as shiftHor=(nH<<$\Delta$shift)>=(nW<2<<4)?0:1; or, expressed as shiftHor=(nH<<$\Delta$shift)>(nW<2<<4)?0:1

Thus, according to the formula (2), by comparing the (nH<<$\Delta$shift) and (nW<<4) if a result of the comparison is true, that is (nH<<$\Delta$shift) is less than (nW<<4), then a value of shiftHor is 1; if the result of the comparison is false, that is (nH<<$\Delta$shift) is greater than or equal to (nW<<4), then the value of shiftHor is 0.

It should also be noted that since shiftHor is used to indicate the shifting directions of different dividing lines of the current block at the same angle, in other words, according to the value of shiftHor, whether the shifting directions of different dividing lines of the current block at the same angle are horizontal directions or vertical directions can be determined. Therefore, in some implementations, the method may further include:
- if the value of a shifting direction indicator is equal to 1, determining that the shifting direction of the dividing line of the current block at the angle is the horizontal direction; and
- if the value of a shifting direction indicator is equal to 0, determining that the shifting direction of the dividing line of the current block at the angle is the vertical direction.

In other words, if the value of shiftHor is 1, the shifting direction of the dividing line of the current block at this angle is the horizontal direction, that is, the dividing line will shift on the X axis; if the value of shiftHor is 0, the shifting direction of the dividing line of the current block at this angle is the vertical direction, that is, the dividing line will be offset on the Y axis.

In act S504, inter prediction is performed on the current block based on the value of a shifting direction indicator and the distance index value.

It should be noted that after obtaining the value of a shifting direction indicator and the distance index value, a target dividing line and offset information of the current block can be determined to calculate the inter prediction value of the current block. Specifically, in some implementations, performing inter prediction on the current block based on the value of a shifting direction indicator and the distance index value may include:
- determining a target dividing line and offset information of the current block based on the value of a shifting direction indicator and the distance index value;
- determining a first prediction value of a first partition of the current block and a second prediction value of a second partition of the current block based on division of the current block by the target dividing line;
- calculating a weight matrix of the current block according to the offset information; and weighting pixel points in the current block using the first prediction value, the second prediction value and the weight matrix to obtain an inter prediction value of the current block.

Understandably, in the GPM prediction mode, after the value of a shifting direction indicator and the distance index value are determined, a target dividing line of the current block can be obtained for dividing the current block into a first partition and a second partition (i.e., a partition A and a partition B). After the two partitions are determined, it is necessary to calculate a unidirectional prediction value of each of the two partitions.

Herein, the GPM prediction mode can reuse an existing conventional merge list and construct a unidirectional merge list pertain to the GPM in a parity check mode, so that candidate motion vector (mv) information of each of the two partitions partitioned with the GPM is selected from the unidirectional merge list.

Figure 6A:
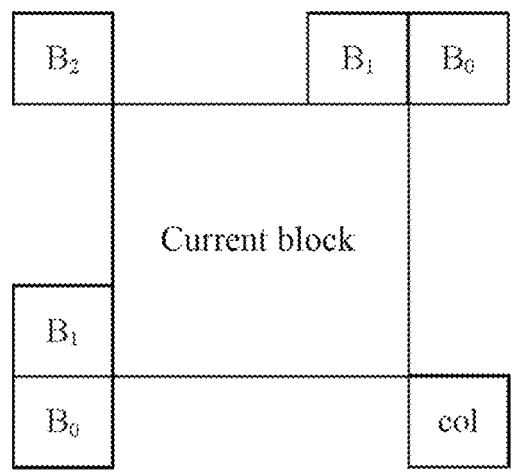
FIG. 6A is a schematic diagram of distribution of adjacent blocks constructing a merge list provided according to an implementation of the present disclosure.

Specifically, a first step is to construct a merge list, which is consistent with a process of constructing a list in a conventional merge mode. A construction order thereof is as follows: an upper adjacent block (denoted by B1), a left adjacent block (denoted by A1), an upper right adjacent block (denoted by B0), a lower left adjacent block (denoted by A0), an upper left adjacent block (denoted by B2), a collocated block of a reference picture (denoted by col), a historical reference block (denoted by his), an average motion vector (denoted by my avg) of first and second candidate mvs, and a zero motion vector (denoted by 0). As shown in FIG. 6A, a schematic diagram of distribution of adjacent blocks to a current block which construct a merge is provided; according to a construction order, a merge list of the current block can be obtained.

In a second step, position information of reference options selected, respectively, by a partition A and a partition B in the merge list can be determined, which are denoted by m and n respectively; an encoder side can assign values to syntax elements according to the following formulas:

merge_gpm_idx0[xCb][yCb]=m merge_gpm_idx1[xCb][yCb]=n−(merge_gpm_idx1 [xCb][yCb]>=m)?1:0.

Then, the syntax elements are processed by binarization and entropy coding, and then signalled in a bitstream for transmission. In other words, on the encoder side, Coding Unit (CU) layer syntax elements corresponding to the current block are described as shown in Table 2 below.

TABLE 2

| merge_data(x0, y0, cbWidth, cbHeight, cbType) { | Descriptor |
|---|---|
| ...... | |
| merge_gpm_partition_idx[x0][y0] | ae(v) |
| merge_gpm_idx0[x0][y0] | ae(v) |
| if( MaxNumGpmMergeCand > 2 ) | |
| merge_gpm_idx1[x0][y0] | ae(v) |
| ......} | |

Here, ae (v) represents context-adaptive arithmetic entropy-coded syntax element, that is, a context-adaptive arithmetic entropy coding syntax element.

Furthermore, let M=mergeCandList [m], which indicates that an m-th item is taken from the merge list for the my construction of the partition A. Because in the current block using the GPM prediction, each partition only uses the unidirectional prediction mode, but each item in the merge list may be my information of bidirectional prediction, so it is necessary to take the unidirectional prediction my for use. Let X=(m & 0x01), wherein & means the "bit AND" operator, which takes a last bit of m (similar to parity). Thus my information (denoted by predFlagLXM) corresponding to a reference picture in a reference list corresponding to X is preferentially used for partition prediction such as an option corresponding to a gray block in FIG. 6B. If the corresponding my is not available (that is, an my of an adjacent block may be unidirectional), then an opposite my (an my represented by a white block which horizontally corresponds to a gray block) will be used, that is, X=1-X.

In this case, corresponding my information is stored in a processing variable of the partition A to prepare the subsequent prediction block construction, as shown below.

mvA[0]=mvLXM[0]
mvA[1]=mvLXM[1]
refIdxA=refIdxLXM
predListFlagA=X

Figure 6B:
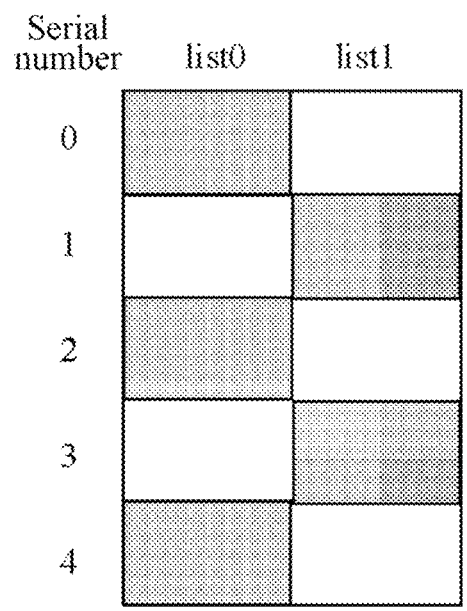
FIG. 6B is a schematic diagram of a structure of unidirectional my selection of a merge list provided according to an implementation of the present disclosure.

The mvA is the my information of the partition A, the refIdxA is a reference picture corresponding to the my information, and the predListFlagA indicates the list of my information options in which a component is currently selected. Wherein, list0 and list1 provided in FIG. 6B represent list0 and list1 corresponding to the current block in two directions; the two directions may be one forward direction and one backward direction, or may also be two forward directions or may also be two backward directions, which is not restricted in implementations of the present disclosure.

Furthermore, let N=mergeCandList[n], which indicates that an n-th item is taken from the merge list for the my construction of the partition B. Wherein, a unidirectional motion vector of the n-th item is used for construction of an mvB, preferentially using an option corresponding to the gray block in FIG. 6B and using the opposite my only if the option is not available. Therefore, let X=(n & 0x01). If predFlagLXN is not available, then X=1-X.

In this case, corresponding my information is stored in a processing variable of the partition B to prepare the subsequent prediction block construction, as shown below.

mvB[0]=mvLXN[0]
mvB[1]=mvLXN[1]
refIdxB=refIdxLXN
predListFlagB=X

The mvB is the my information of the partition B, the refIdxB is a reference picture corresponding to the my information, and the predListFlagB indicates the list of my information options in which a component is currently selected.

Figure 7:
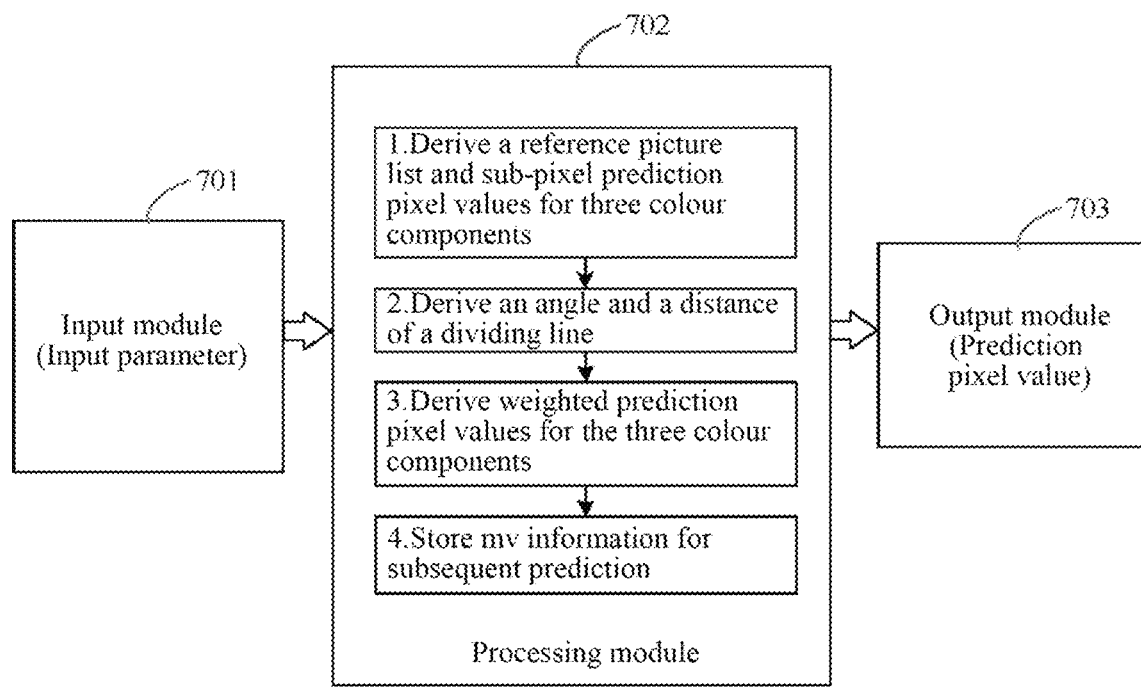
FIG. 7 is a schematic diagram of an overall architecture of a GPM prediction processing flow provided according to an implementation of the present disclosure.

As shown in FIG. 7, a schematic diagram of an overall architecture of a GPM prediction processing flow provided according to an implementation of the present disclosure. In FIG. 7, the overall architecture may include an input module 701 a processing module 702 and an output module 703. The input module 701 provides input parameters in a GPM prediction mode, the input parameters include: a pixel position of a current block, which can be described by a luma location (xCb, yCb) when taking a luma component as an example; size information of the current block, which can be described by cbWidth and cbHeight; my information of the luma component with 1/16 pixel accuracy, which can be expressed by 1/16 fractional-sample accuracy mvA and mvB; my information of a colour component with 1/32 pixel accuracy, which can be expressed by 1/32 fractional-sample accuracy mvCA and mvCB; a reference picture corresponding to the my information, which can be represented by refIdxA and refIdxB; a list identifier selected for the my information, which is expressed by predListFlagA and predListFlagB. The processing module 702 includes three acts: firstly, a reference picture list (denoted by refPicLN) and a sub-pixel prediction pixel value (denoted by predSamplesLN) are derived for three colour components (including an L component, a Cb component and a Cr component), wherein N is A or B, and the sub-pixel prediction pixel value is in depth of 14 bits; secondly, an angle and a distance of a dividing line are derived; thirdly, weighted prediction pixel values (denoted by predSamples) are derived for the three colour components; finally, the mv information is stored for subsequent prediction of the mvN, the refIdxN and the predListFlagN. The output module 703 is configured to output the prediction pixel values which may include prediction pixel values corresponding to the three colour components respectively, which are denoted by predSampleL predSampleCb and predSampleCr, respectively. Herein, the same as a conventional inter prediction technique, that is, an existing motion compensation method is used to calculate a unidirectional prediction value of each of the two partitions, so as to be used in a weighted merge process for subsequent GPM prediction.

Figure 8:
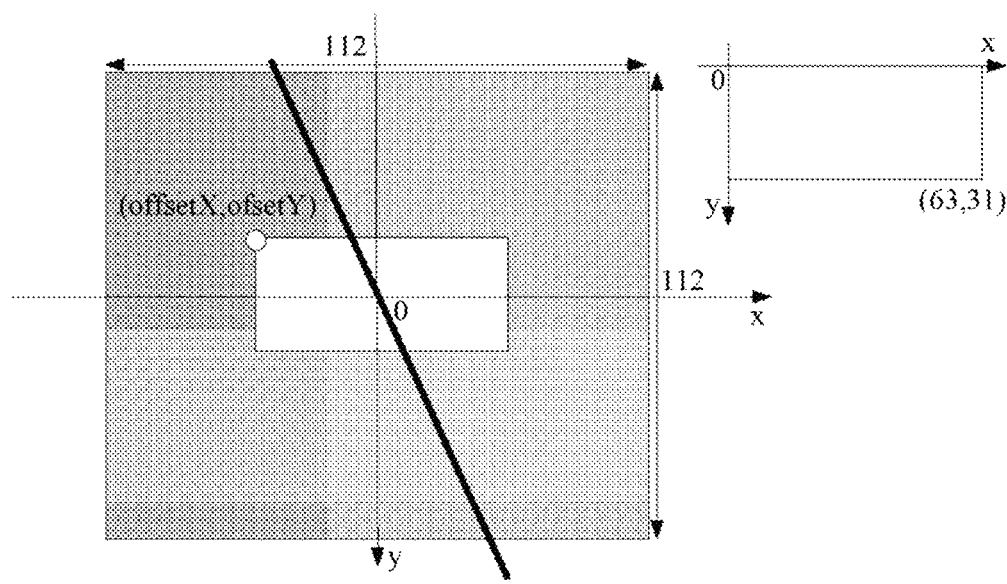
FIG. 8 is a schematic diagram of a structure of offset information calculation provided according to an implementation of the present disclosure.

It should be noted that before performing the weighted merge process, a weight matrix of the current block needs to be determined. Before determining the weight matrix of the current block, firstly, it is necessary to calculate offset information of an upper left corner of the current block with respect to the coordinate origin according to a partition mode of the current block and a value of a shifting direction indicator, and the offset information can be denoted by offset(x, y), and the coordinate origin is at a geometrical center point of blocks in a same size of which dividing lines passes through the geometrical center point at the same angle, as shown in FIG. 8. In FIG. 8, a black bold line represents the dividing line, and a gray background is a maximum moving range (112×112) of the current block (64×64) with a largest size relative to the coordinate system through a vector corresponding to the offset information according to the current limitations. If the dividing line does not pass through the geometrical center point of the current block, a relative position of the dividing line stays, and the position of the current block in the coordinate system is moved, so that an appropriate division can be obtained to divide the current block into a first partition and a second partition, namely, the partition A and the partition B.

Because a distance d=cos αx1−sin αy1 from a coordinate points (x1, y1) to the line cos αx−sin αy=0 in this case, it is necessary to obtain an index value of displacement X of α in cos(α) corresponding to the current angle, and an index value displacement Y of $$\alpha + \frac{\pi}{2}$$

in a corresponding formula $$-\sin(\alpha) = \cos(\alpha + \frac{\pi}{2});$$

a specific calculation is as follows, $$\text{displacement}X = \text{angleIdx} \quad (4)$$

$$\text{displacement}Y = (\text{displacement}X + 8)\%32 \quad (5)$$

When constructing a predefined weight matrix, a distance used is only a first distance (that is, the dividing line must intersect the geometrical center point of the current block).

Furthermore, since transmission of relevant information in a bitstream of the partition A and the partition B is sequential, some principle must be followed in a sequence arrangement of the two partitions, that is, a partFlip value is calculated by the following formula, specifically as follows, $$\text{partFlip}=(\text{angleIdx}>=13\&\&\text{angleIdx}<=27)?0:1 \quad (6)$$

Wherein the partFlip is used to indicate where the partition A and the partition B are distributed within the current block. Specifically, if the partFlip value is 0, it means that a side where the weight index value weightIdx obtained in the subsequent formula (11) is negative is the partition A, and the opposite side is the partition B; if the partFlip value is 1, the opposite is the case, i.e., a side where the weight index value weightIdx is positive is the partition A, and the opposite side (i.e. the negative side) is partition B.

Furthermore, offset information of the current block, i.e. offsetX in the X-axis direction and offsetY in the Y-axis direction, can be calculated from a value of a shifting direction indicator (which can be denoted by shiftHor) and a distance index value (which can be denoted by distanceIdx) which are already obtained.

If the value of a shifting direction indicator is equal to 0, that is, the shiftHor is equal to 0, then the current block has an offset value related to the height of the current block in the vertical direction, and the offset information at this time is as follows.

$$\text{offset}X=(-nW)>>1 \quad (7)$$

$$\text{offset}Y=((-nH)>>1)+\text{angleIdx}<16?\\(\text{distanceIdx}*nH)>>3: -((\text{distanceIdx}*nH)>>3) \quad (8)$$

If the value of a shifting direction indicator is equal to 1, that is, the shiftHor is equal to 1, then the current block has an offset value related to the width of the current block in the vertical direction, and the offset information at this time is as follows.

$$\text{offset}X=((-nW)>>1)+\text{angleIdx}<16?\\(\text{distanceIdx}*nW)>>3:-((\text{distanceIdx}*nW)>>3) \quad (9)$$

$$\text{offset}Y=(-nH)>>1 \quad (10)$$

Where ">>" represents a right shift operator, the nW represents the width of the current block, and the nH represents the height of the current block.

Herein, after the offset information offsetX and offsetY are determined, the weight index value (denoted by weightIdx) at the current pixel point can be calculated through a pixel point position in the current block, and then the weight value at the current pixel point can be calculated to obtain the weight matrix of the current block.

$$\text{weightIdx}=(((x*\text{sub}W+\text{offset}X)<<1)+1)*\text{disLut}[\text{displacement}X]+(((y*\text{sub}H+\text{offset}Y)<<1)+1)*\text{disLut}[\text{displacement}Y](11)$$

$$\text{weightIdx}L=\text{partFlip}?32+\text{weightIdx}:32-\text{weightIdx} \quad (12)$$

$$w\text{Value}=\text{Clip3}(0,8,(\text{weightIdx}L+4)>>3) \quad (13)$$

Wherein, the clip3 represents a clip operator, 0 represents a lower bound value, and 8 represents an upper bound value. For example, clip3 (I, J, X) represents: when x is less than i, its value is i; when x is greater than j, its value is j; when x is greater than or equal to i and less than or equal to j, its value is x.

In addition, Table 3 provides an example of a geometrical dividing line distance arrangement lookup table. The disLut [ ] used in the formula (11) is shown in Table 3, and the subW and the subH represent a down-sampling rate. If a YUV format of the current block is a 420 format, both of the subW and the subH can be 2.

TABLE 3

| idx |   |   |   |   |   |   |   |   |   |   |   |
|---|---|---|---|---|---|---|---|---|---|---|---|
|  | 0 | 2 | 3 | 4 | 5 | 6 | 8 | 10 | 11 | 12 | 13 | 14 |
| disLut[idx] | 8 | 8 | 8 | 4 | 4 | 2 | 0 | −2 | −4 | −4 | −8 | −8 |
|  | 16 | 18 | 19 | 20 | 21 | 22 | 24 | 26 | 27 | 28 | 29 | 30 |
| disLut[idx] | 8 | −8 | −8 | −4 | −4 | −2 | 0 | 2 | 4 | 4 | 8 | 8 |

Herein, the smaller an absolute value of the weightIdx is, the closer the current pixel is to an edge of the partition, and the more evenly distributed the weights at the pixel on the two partitions A and B are.

In addition, a luminance does not need to be down-sampled, and chrominance weights are obtained by down-sampling for a luminance weight. Specifically, the encoder may directly take a weight of the luminance sample in an upper right corner of each 2*2 block as a weight of a chrominance sample in the current pixel point (x, y), that is, downsampling a weight of a luminance sample.

Exemplary, what is shown in FIG. 9A is a luminance weight matrix, which is down-sampled to obtain a chrominance weight matrix shown in FIG. 9B. A luminance sample weight of one pixel point (preferably the upper left corner pixel point) within each 2*2 block in FIG. 9A is selected directly as the chrominance sample weight at the current pixel point (x, y), thereby downsampling of the luminance sample weight is achieved.

Furthermore, for the current block, its inter prediction value may be represented by a prediction value corresponding to each of the three colour components, and each prediction value may be weighted using the following formula (14). Specifically, the unidirectional prediction values of the two partitions are weighted and merged pixel by pixel, so that an inter prediction value of each pixel in the current block can be obtained, and a final GPM prediction block can be obtained. A specific weighting calculation mode is as follows.

$$pbSampls[x][y]=Clip3(0,(1<<BitDepth)-1,(predSamplesLA[x][y]*wValue+predSamplesLB[x][y]*(8-wValue)+offset1)>>shift1) \quad (14)$$

The BitDepth represents a bit depth, the offset1 is used for rounding, and the shift1 is used to restore a weighted average prediction value to a bit depth which is the same as that of the input video. The offset1 and the shift1 are calculated as follows.

$$shift1=Max(5,17-BitDepth) \quad (15)$$

$$offset1=1<<(shift1-1) \quad (16)$$

Furthermore, the mv information of the GPM prediction block needs to be stored. The stored process may be implemented using a motion mask matrix of the current luminance block. If the prediction value is entirely from the partition A, the mv information of the partition A is recorded; if the prediction value comes completely from the partition B, the mv information of the partition B is recorded; otherwise, the mv information of the both partitions are recorded simultaneously. Here, calculation of the motion mask basically coincides with calculation of the luminance weight matrix. Firstly, offset information, which includes an offsetX in the X-axis direction and an offsetY in the Y-axis direction, is calculated.

If the value of a shifting direction indicator is equal to 0, that is, the shiftHor is equal to 0, the offset information at this time is as follows.

$$offsetX=(-cbWidth)>>1 \quad (17)$$

$$offsetY((-cbHeight)>>1)+(angleIdx<16? \\ ((distanceIdx*cbHeight)>>3):- \\ ((distanceIdx*cbHeight)>>3)) \quad (18)$$

If the value of a shifting direction indicator is equal to 1, that is, the shiftHor is equal to 1, the offset information at this time is as follows.

$$offsetX=((-cbWidth)>>1)+(angleIdx<16? \\ ((distanceIdx*cbWidth)>>3):- \\ ((distanceIdx*cbWidth)>>3)) \quad (19)$$

$$offsetY=(-cbHeight)>>1 \quad (20)$$

The cbWidth and the cbHeight are a width and a height of the motion mask matrix corresponding to the GPM prediction block (that is, a width and a height of the luma component of the current block).

Since the motion mask matrix of the GPM prediction block is still calculated in a unit of 4×4 sub-blocks, a calculation of a motion index value (which can be denoted by motionIdx) at a geometrical center position (4i+2, 4j+2) of each 4×4 sub-block is similar to a calculation of the weight index value weightIdx, as shown below.

$$motionIdx=(((4*xSbIdx+offsetX)<<1)+5)*disLut[displacementX]+(((4*ySbIdx+offsetY)<<1)+5)*disLut[displacementY] \quad (21)$$

Then, the mv information to be stored in the current 4×4 sub-block is determined. As in a predictive weighting, it is necessary to firstly determine whether the current sub-block is in the partition A or the partition B, and a calculation of partIdx is as shown in formula (6) above. Herein, (xSbIdx, ySbIdx) represents sub-block coordinate information of each 4×4 sub-block (SubBlock (SB)) in the current CU, and a range of the coordinate information is xSbIdx=0, . . . , numSbX−1, ySbIdx=0, . . . , numSbY−1. PartIdx represents whether two partitions need to be flipped.

$$sType=abs(motionIdx)<32?2:(motionIdx<=0?partIdx:(1-partIdx)) \quad (22)$$

In this way, it is judged whether the current sub-block stores a unidirectional mv or a bidirectional mv according to a size of abs (motionIdx) at the geometrical center position (4i+2, 4j+2) of each 4×4 sub-block, a specific judgment process is as follows.

If the value of an sType is 2, then the current block stores the bidirectional mv of the construction; otherwise, if the value of the sType is 0, then the current block stores an mvA of the first partition; if the value of the sType is 1, then the current block stores an mvB of the second partition. It should be noted that the stored mv information will be used for mv prediction of a subsequent coding block.

Thus, in conjunction with an example of an overall architecture of a GPM prediction processing flow shown in FIG. 7, after determining the first prediction value of the first partition of the current block and the second prediction value of the second partition of the current block, since the weight matrix of the current block can also be calculated according to the offset information, then the first predictive value, the second predictive value and the weight matrix are used to weight and merge each pixel point in the current block, and the inter prediction value of the current block can be obtained.

However, in the GPM prediction process, a calculation process of the value of a shifting direction indicator (shiftHor) in the original solution is as follows.

$$HwRatio=nH/nW \quad (23)$$

$$shiftHor=((angleIdx \%16==8)||(angleIdx \%16!=\&0\& \&HwRatio>))?0:1 \quad (24)$$

The nH represents the height of the current block, the nW represents the width of the current block, the HwRatio represents a height-width ratio of the current block, and the angleIdx represents the angle index value of the current block.

According to the formulas (23) and (24), a calculation process of the shiftHor in the original solution employs three comparison operations, one OR operation, one AND operation and one division operation, the calculation process is are complicated; while a calculation process of the shiftHor in an implementation of the present disclosure is shown in formulas (1) and (2), and only two comparison operations, two shift operations and one subtraction operation are employed, and the comparison between the two calculation processes is shown in Table 4. Because there are fewer comparisons and the OR operation and the AND operation are not used in the solution of the present disclosure, the solution of the present disclosure simplifies the calculation process of the shiftHor and reduces the calculation complexity.

greater than an interval of the vertical moving dividing line, the horizontal moving dividing line is employed at this time, and the vertical moving dividing line is employed in other cases. Referring to FIG. 10B, a schematic diagram showing a correspondence between a block size, an angle index value and a dividing line moving direction provided according to an implementation of the present disclosure is shown. As shown in FIG. 10B, the original solution is modified so that for the gray areas, a dividing line is moved horizontally and for the black areas a dividing line is moved vertically; for the white areas in the center, a dividing line is moved vertically, but in the white areas, a horizontal direction and a vertical direction can be randomly selected for moving, and technical effects are the same.

Combined with FIGS. 10A and 10B, the white areas correspond to a product of the angle tangent (denoted by tan ( )) and the height-width ratio (denoted by h/w) of the current block being 1, or an angle cotangent being equal to the height-width ratio of the block, or the angle tangent being equal to the width-height ratio of the block. In this case, by moving dividing lines in the horizontal direction and the vertical direction, a spacing of a horizontal moving dividing line is the same as a spacing of a vertical moving dividing line. The gray areas correspond to a product of the angle tangent and the height-width ratio of the block being less than 1, or the angle cotangent being greater than the height-width ratio of the block, or the angle tangent being less than the width-height ratio of the block, and the spacing of the horizontal moving dividing line is greater than the spacing of the vertical moving dividing line. The black areas have characteristics opposite to that of the gray areas, that is,

TABLE 4

| Calculation process | Comparison operation | OR operation | AND operation | Shift operation | Addition and subtraction (Inverting) | Division (shifting) |
|---|---|---|---|---|---|---|
| Original solution | 3 | 1 | 1 | 0 | 0 | 1 |
| Solution of the present disclosure | 2 | 0 | 0 | 2 | 1 | 0 |

In addition, according to selection of a moving direction of the dividing line at different angles in the original solution, that is, in combine with a summary of characteristics of the moving direction in FIGS. 3A, 3B and 3C, a schematic diagram of a correspondence between the block size, the angle index value and the moving direction of the dividing line in the original solution as shown in FIG. 10A can be obtained. In FIG. 10A, in gray areas, a spacing for moving in the horizontal direction is greater than a spacing for moving in the vertical direction, but a vertical movement is selected in many cases in the original solution.

In an implementation of the present disclosure, a technique of optimizing a moving direction of a GPM dividing line is employed, that is, a calculation process of the shiftHor is optimized. By analyzing a principle of a dividing line moving direction in the original solution, it can be found that the relationship between the moving direction of the dividing line and the spacing (also referred to as an interval) can be accurately expressed by using the relationship between an angle tangent and the height-width ratio of the block. In other words, a determination mode of the ShiftHor is modified in an implementation of the present disclosure, so that when an interval of the horizontal moving dividing line is the spacing of the vertical moving dividing line is greater than the spacing of the horizontal moving dividing line. As such, based on the solution in an implementation of the present disclosure, according to indication of the above characteristic, as shown in FIG. 10B, a logarithmic value of a tangent function of the dividing line angle is expressed with piecewise linear approximation by using the angle index value, and the vertical moving dividing line is employed for the black areas, the horizontal moving dividing line is employed for the gray areas, and the vertical moving dividing line or the horizontal moving dividing line can be employed for the white areas.

Exemplarily, information of the product of the angle tangent and the height-width ratio of the current block as shown in Table 5 is employed, wherein 4/1, 2/1, 1/1, 1/2, 1/4 in a left column indicate the height-width ratios of the current block, digits 0, 16, 2, 18, 14, 30 and the like in an upper line indicate the angle index values, and a numeral in the middle position indicates the product of the angle tangent and the height-width ratio. Herein, all areas with a product less than (or less than or equal to) 1 employ a horizontal moving dividing line, and all areas with a product greater than or equal to (or greater than) 1 employ a vertical moving dividing line, thus determination of the moving direction of the dividing line in the current block is implemented.

TABLE 5

| Product | 0\16 | 2\18\14\30 | 3\19\13\29 | 4\20\12\28 | 5\21\11\27 | — | 8/24 |
|---|---|---|---|---|---|---|---|
| 4/1 | 0 | 1 | 2 | 4 | 8 | 16 | ∞ |
| 2/1 | 0 | 1/2 | 1 | 2 | 4 | 8 | ∞ |
| 1/1 | 0 | 1/4 | 1/2 | 1 | 2 | 4 | ∞ |
| 1/2 | 0 | 1/8 | 1/4 | 1/2 | 1 | 2 | ∞ |
| 1/4 | 0 | 1/16 | 1/8 | 1/4 | 1/2 | 1 | ∞ |

Based on this, compared with the original solution, the method for inter prediction in an implementation of the application can also modify a rule of the moving direction of the dividing line in the GPM prediction mode, so that the distribution of the dividing lines in all block sizes in all modes is more uniform, and performance loss caused by square and vertical long blocks at angles with the angle indexes of 2, 18, 14 and 30 in the original solution is compensated. For example, the method for inter prediction according to an implementation of the present disclosure is based on a latest version of a VVC reference software, and a rough preliminary test is performed on a test sequence required by the JVET in condition of Random Access, and codec performances on three colour components (Y component, Cb component and Cr component) are −0.03%, −0.04% and −0.24%, respectively, so that the codec efficiency can be improved.

Furthermore, for a calculation process of the shiftHor, besides the preset model shown in the above fomula (2) or (3), the following preset model may also be used for the calculation.

Optionally, in some implementations, for the act S503, determining the value of a shifting direction indicator of the current block by using the preset model based on the size information and the angle index value of the current block may include:

determining a first refinement value according to the angle index value;
using the first refinement value to shift the height of the current block to obtain a shifted height;
performing a ratio operation on the shifted height and the width of the current block to obtain a height-width ratio of the current block;
comparing the height-width ratio of the current block with a preset ratio; and
obtaining a value of a shifting direction indicator of the current block according to a result of comparison.

It should be noted that the preset ratio can be 16, and the first refinement value can still be calculated with the formula (1). Thus, the height-width ratio of the current block (denoted by normalHwRatio) is calculated as follows.

normalHwRatio=(nH<<(((angleIdx %16)>8)?(16−(angleIdx %16)):(angleIdx %16)))/nW    (25)

The "<<" represents a left shift operator. After calculating the height-width ratio of the current block, the value of a shifting direction indicator (denoted by shiftHor) of the current block is calculated as follows.

shiftHor=normalHwRatio<16    (26)

For the formula (26), there are many equivalent forms of the formula, which is not specifically restricted in implementations of the present disclosure.

Exemplarily, an equivalent form of the formula (26) may be shiftHor=normalHwRatio<=16; or, an equivalent form of the formula can also be shiftHor=normalHwRatio>16?0:1; or, the equivalent form of the formula can also be shiftHor=normalHwRatio>=16?0:1

In addition, a judgment condition (anglIdx %16)>8 in the formula (25) can be replaced by (angleIdx %16)>=8, while the alternative solution can be applied to calculation of other shiftHor in an implementation of the present disclosure in which the judgment condition is included, which will not be described later.

Optionally, in some implementations, for the act S503, determining the value of a shifting direction indicator of the current block by using the preset model based on the size information and the angle index value of the current block may include:

performing logarithmic operation on the width and the height of the current block respectively to obtain a logarithmic value of the width and a logarithmic value of the height;
calculating a difference between the logarithm value of the width and the logarithm value of the height;
adding the calculated difference and a first preset value to obtain a second refinement value;
comparing the second refinement value with the first refinement value; and
obtaining a value of a shifting direction indicator of the current block according to a result of comparison.

It should be noted that the first preset value can be 4, and the first refinement value is still calculated with the formula (1). Thus, the value of a shifting direction indicator (denoted by shiftHor) is calculated as follows.

shiftHor=(log 2(nW)−log 2(nH)+4)>
(((angleIdx %16)>8)?(16−angleIdx %16):
angleIdx %16)    (27)

Herein, the log 2 ( ) represents a logarithmic operation with a logarithmic base of 2. If a result of the comparison is true, that is the (log 2(nW)−log 2(nH)+4) is greater than (((angleIdx %16)>8)?(16−angleIdx %16): angleIdx %16) then the value of shiftHor is 1; otherwise, the result of the comparison is false, that is, the value of shiftHor is 0.

In addition, for the formula (27), there are many equivalent forms of the formula, which is not specifically restricted in implementations of the present disclosure. Exemplarily, an equivalent form represents as follows, shiftHor=(log 2(nW)−log 2(nH)+4)>=
(((angleIdx %16)>8)?(16−angleIdx %16):
angleIdx %16)    (28)

Optionally, in some implementations, for the act S503, determining the value of a shifting direction indicator of the current block by using the preset model based on the size information and the angle index value of the current block may include:

using a preset offset value to shift the height of the current block to obtain a shifted height;
performing a ratio operation on the shifted height and the width of the current block to obtain a height-width ratio of the current block;
using a first refinement value to shift a second preset value to obtain a shifted refinement value;
comparing the shifted refinement value with the height-width ratio of the current block; and
obtaining a value of a shifting direction indicator of the current block according to a result of comparison.

It should be noted that the preset offset value can be 4, the second preset value can be 256, and the first refinement value is still be calculated with the formula (1). Thus, the height-width ratio of the current block (denoted by HwRatio) is calculated as follows.

HwRatio=(nH<<4)/nW    (29)

After calculating the height-width ratio of the current block, the value of a shifting direction indicator (denoted by shiftHor) is calculated as follows.

$$\text{shiftHor}=(256>>(((\text{angleIdx }\%16)>8)?\\(16-\text{angleIdx }\%16):\text{angleIdx }\%16))>\text{HwRatio} \quad (30)$$

Herein, the ">>" represents the right shift operator. For the formula (30), there are many equivalent forms of the formula, which is not specifically restricted in implementations of the present disclosure. Exemplarily, an equivalent form is represented as follows.

$$\text{shiftHor}=(256>>(((\text{angleIdx }\%16)>8)?\\(16-\text{angleIdx }\%16):\text{angleIdx }\%16))>=\text{HwRatio} \quad (31)$$

Furthermore, the calculation of the first refinement value can be implemented by means of a look-up table. In some implementations, calculating the first refinement value based on the angle index value may include:

searching for a logarithmic value corresponding to the angle index value from a first look-up table based on the angle index value; and determining a searched-out logarithmic value as the first refinement value.

Here, the first look-up table is shown in Table 6, from which a logarithmic value corresponding to the angle index value can be found, and the found logarithmic value is determined as a first refinement value.

TABLE 6

| | idx | | | | | | | | | | | |
|---|---|---|---|---|---|---|---|---|---|---|---|---|
| | 0 | 2 | 3 | 4 | 5 | 6 | 8 | 10 | 11 | 12 | 13 | 14 |
| disLut[idx] | 8 | 8 | 8 | 4 | 4 | 2 | 0 | -2 | -4 | -4 | -8 | -8 |
| Log2TanAnglePlus3[idx] | 0 | 1 | 2 | 3 | 4 | 5 | 6 | 5 | 4 | 3 | 2 | 1 |
| | 16 | 18 | 19 | 20 | 21 | 22 | 24 | 26 | 27 | 28 | 29 | 30 |
| disLut[idx] | -8 | -8 | -8 | -4 | -4 | -2 | 0 | 2 | 4 | 4 | 8 | 8 |
| Log2TanAnglePlus3[idx] | 0 | 1 | 2 | 3 | 4 | 5 | 6 | 5 | 4 | 3 | 2 | 1 |

It should be noted that, in this case, the first refinement value can also be denoted by Log 2 Tan AnglePlus3[idx]. In the first look-up table, if the angle index value is 0, the first refinement value can be found to be 0; if the angle index value is 2, the first refinement value can be found to be 1 and so on.

Optionally, in some implementations, the first refinement value is denoted by Log 2 Tan AnglePlus3[idx], then the value of a shifting direction indicator (shiftHor) of the current block is calculated as follows.

$$\text{shiftHor}=(nH<<\text{Log 2 Tan AnglePlus3}[\text{angleIdx}])<\\(nW<<3) \quad (32)$$

Herein, for the formula (32), there are many equivalent forms of the formula, which is not specifically restricted in implementations of the present disclosure. Exemplarily, an equivalent form is represented as follows.

$$\text{shiftHor}=(nH<<\text{Log 2 Tan AnglePlus3}[\text{angleIdx}])<=\\(nW<<3) \quad (33)$$

Optionally, in some implementations, the first refinement value is denoted by Log 2 Tan AnglePlus3[idx], then the height-width ratio (denoted by HwRatio) of the current block is calculated as follows.

$$\text{HwRatio}=(nH<<\text{Log 2 Tan AnglePlus3}\\{[\text{angleIdx}]})/nW \quad (34)$$

After calculating the height-width ratio of the current block, the value of a shifting direction indicator (denoted by shiftHor) of the current block is calculated as follows.

$$\text{shiftHor}=\text{HwRatio}<8 \quad (35)$$

For the formula (35), there are many equivalent forms of the formula, which is not specifically restricted in implementations of the present disclosure.

Exemplarily, an equivalent form of the formula (35) may be shiftHor=HwRatio<=8; or, an equivalent form of the formula can also be shiftHor=HwRatio<=8?1:0; or, the equivalent form of the formula can also be shiftor= HwRatio>8?0:1

Optionally, in some implementations, the first refinement value is denoted by Log 2 Tan AnglePlus3[idx], then the height-width ratio (denoted by HwRatio) of the current block is calculated as follows.

$$\text{HwRatio}=(nH<<3)/nW \quad (36)$$

After calculating the height-width ratio of the current block, the value of a shifting direction indicator (denoted by shiftHor) is calculated as follows.

$$\text{shiftHor}=(128>>\text{Log 2 Tan AnglePlus3}\\{[\text{angleIdx}]})>\text{HwRatio} \quad (37)$$

Herein, the ">>" represents the right shift operator. For the formula (37), there are many equivalent forms of the formula, which is not specifically restricted in implementations of the present disclosure. Exemplarily, an equivalent form is represented as follows.

$$\text{shiftHor}=(128>>\text{Log 2 Tan AnglePlus3}\\{[\text{angleIdx}]})>=\text{HwRatio} \quad (38)$$

Furthermore, in an implementation of the present disclosure, the value of a shifting direction indicator of the current block, i.e. the moving direction of the dividing line in the current block, can also be determined by only considering the angle index value of the current block, without considering the size information of the current block. In some implementations, for the act S503, determining the value of a shifting direction indicator of the current block by using the preset model based on the size information and the angle index value of the current block may include:

adding the angle index value and a fifth preset value to obtain an addition result;

using the addition result to perform modulo operation on a sixth preset value to obtain a modulus result;

comparing the modulus result with a seventh preset value; and obtaining a value of a shifting direction indicator of the current block according to a result of comparison.

It should be noted that in a possible implementation, the fifth preset value can be 4, the sixth preset value can be 16, and the seventh preset value can be 9, then the value of a shifting direction indicator (denoted by shiftHor) is calculated as follows.

$$\text{shiftHor}=(\text{angleIdx}+4)\%16<9 \quad (39)$$

In another possible implementation, the fifth preset value can be 11, the sixth preset value can be 16, and the seventh preset value can be 7, then the value of a shifting direction indicator (denoted by shiftHor) is calculated as follows.

$$\text{shiftHor}=(\text{angleIdx}+11)\%16<7?0:1 \quad (40)$$

In yet another possible implementation, the fifth preset value can be 3, the sixth preset value can be 16, and the seventh preset value can be 7, then the value of a shifting direction indicator (denoted by shiftHor) is calculated as follows.

$$\text{shiftHor}=(\text{angleIdx}+3)\%16<7 \quad (41)$$

In another yet possible implementation, the fifth preset value can be 4, the sixth preset value can be 16, and the seventh preset value can be 8, then the value of a shifting direction indicator (denoted by shiftHor) is calculated as follows.

$$\text{shiftHor}=(\text{angleIdx}+4)\%16>8?0:1 \quad (42)$$

It should also be noted that in addition to the above formulas (39)-(42), the methods in the implementations of the present disclosure are also applicable to other equivalent forms of these formulas.

Furthermore, in an implementation of the present disclosure, only in a diagonal direction and an oblique diagonal direction, the value of a shifting direction indicator of the current block (i.e., the moving direction of the dividing line in the current block) is determined according to the size information of the current block, but in other angular directions, the value of a shifting direction indicator of the current block (i.e., the moving direction of the dividing line in the current block) is determined according to the angle index value. Specifically, it may be implemented by the following formula or its equivalent form, which is not specifically restricted in implementations of the present disclosure. Exemplarily, $$\text{shiftHor}=((\text{angleIdx }\%16<4\|\text{angleIdx }\%16>12)\|\\(\text{angleIdx }\%8==4\&\&\text{HwRatio}<1)) \quad (43)$$

or, $$\text{shiftHor}=((\text{angleIdx}+3)\%16<7\|(\text{angleIdx }\%8==4\&\&\text{HwRatio}<1)) \quad (44)$$

or, $$\text{shiftHor}=((\text{angleIdx }\%16>4\&\&\text{angleIdx }\%16<12)\|\\((\text{angleIdx }\%8==4)\&\&\text{HwRatio}>=1))?0:1 \quad (45)$$

or, $$\text{shiftHor}=((\text{angleIdx}+11)\%16<7\|((\text{angleIdx }\%8==4)\\\&\&\text{HwRatio}>=1))?0:1 \quad (46)$$

or, $$\text{shiftHor}=((\text{angleIdx }\%16<4\|\text{angleIdx }\%16>12)\|(\text{angleIdx }\%8==4\&\&\text{HwRatio}<=1)) \quad (47)$$

or, $$\text{shiftHor}=((\text{angleIdx}+3)\%16<7\|(\text{angleIdx }\%8==4\&\&\text{HwRatio}<=1)) \quad (48)$$

or, $$\text{shiftHor}=((\text{angleIdx }\%16>4\&\&\text{angleIdx }\%16<12)\|\\((\text{angleIdx }\%8==4)\&\&\text{HwRatio}>1))?0:1 \quad (49)$$

or, $$\text{shiftHor}=((\text{angleIdx}+11)\%16<7\|((\text{angleIdx }\%8==4)\\\&\&\text{HwRatio}>1))?0:1 \quad (50)$$

Furthermore, the value of a shifting direction indicator of the current block, i.e. whether the dividing line within the current block moves in the horizontal direction or in the vertical direction, can also be determined by a second look-up table. In some implementations, for the act S503, determining the value of a shifting direction indicator of the current block by using the preset model based on the size information and the angle index value of the current block may include:

searching for a shifting indication value corresponding to the angle index value from a second look-up table based on the angle index value; and comparing a searched-out shifting indication value with a preset judgment result; and obtaining the value of a shifting direction indicator of the current block according to a comparison result, wherein, the preset judgment result is obtained by judging whether the height of the current block is greater than the width of the current block.

It should be noted that, the second lookup table is shown in Table 7, from which a shifting indication value corresponding to the angle index value can be found, and the value of a shifting direction indicator of the current block can be determined according to the found shifting indication value.

TABLE 7

| | idx | | | | | | | | | | | | |
|---|---|---|---|---|---|---|---|---|---|---|---|---|---|
| | 0 | 2 | 3 | 4 | 5 | 6 | 8 | 10 | 11 | 12 | 13 | 14 | 4 |
| shiftLut[idx] | 2 | 2 | 3 | 1 | 0 | 0 | 0 | 0 | 0 | 1 | 2 | 2 | 1 |
| | 16 | 18 | 19 | 20 | 21 | 22 | 24 | 26 | 27 | 28 | 29 | 30 | 20 |
| shiftLut [idx] | 2 | 2 | 2 | 1 | 0 | 0 | 0 | 0 | 0 | 1 | 2 | 2 | 1 |

Or, a shifting indication item can be added based on the existing Table 3 to select different parameters, as shown in Table 8.

TABLE 8

| | idx | | | | | | | | | | | |
|---|---|---|---|---|---|---|---|---|---|---|---|---|
| | 0 | 2 | 3 | 4 | 5 | 6 | 8 | 10 | 11 | 12 | 13 | 14 |
| disLut[idx] | 8 | 8 | 8 | 4 | 4 | 2 | 0 | −2 | −4 | −4 | −8 | −8 |
| shiftLut[idx] | 2 | 2 | 1 | 1 | 1 | 1 | 0 | 1 | 1 | 1 | 1 | 2 |
| | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |
| shiftLut[idx] | 2 | 2 | 1 | 1 | 1 | 1 | 0 | 1 | 1 | 1 | 1 | 2 |

Herein, meaning of the elements in Table 7 or Table 8 is as follows: the element 0 indicates that dividing lines in all block sizes only move in the vertical direction; the element 2 indicates that dividing lines in all block sizes only move in the horizontal direction; the element 1 indicates that the dividing lines for horizontal rectangular and square blocks move in the horizontal direction, and the dividing lines for vertical rectangular blocks move in the vertical direction.

It should also be noted that the value of a shifting direction indicator (denoted by shiftHor) herein is calculated as follows.

$$\text{shiftHor}=(\text{shiftLut}[\text{angleIdx}]>(\text{HwRatio}>1)) \tag{51}$$

or, $$\text{shiftHor}=(\text{shiftLut}[\text{angleIdx}]>(\text{Height}>\text{Width})) \tag{52}$$

In other words, by modifying the determination mode of the ShiftHor, only the dividing lines of square, vertical rectangular or horizontal blocks corresponding to angles with angle index values of 2, 18, 14, 30 and 3, 19, 13 and 29 are enabled to move only in the horizontal direction (that is, part of the angles closest to the horizontal angle are adjusted to move only in the horizontal direction), while the dividing lines of square, vertical rectangular or horizontal rectangular blocks corresponding to angles with angle indexes of 5, 21, 11 and 27 are enabled to move only in the vertical direction (that is, parts of the angles closest to the vertical angle are adjusted to move only in the vertical direction).

Furthermore, in some implementations, in case of an interval of dividing lines for moving in the horizontal direction being the same as an interval of dividing lines for moving in the vertical direction, regardless of moving horizontally or vertically, effects achieved are equivalent. In this case, by modifying the determination mode of the ShiftHor, the square or vertical rectangular blocks corresponding to the angles with the angle index values of 2, 18, 14, and 30 are enabled to move in the horizontal direction only, and adjusts the square block to move in the horizontal direction at the angles corresponding to the angle index values of 3, 19, 13, and 29, as shown in FIG. 11A.

In this case, it may be implemented by the following formula or its equivalent form, which is not specifically restricted in implementations of the present disclosure. Exemplarily, $$\text{shiftHor}=((\text{angleIdx}+2)\%16<5\|((\text{angleIdx}\\ \%16==4\|\text{angleIdx }\%16==5\|\text{angleIdx}\\ \%16==11\|\text{angleIdx }\%16==12)\&\&\text{HwRatio}<1)\|\\ ((\text{angleIdx }\%16==3\|\text{angleIdx }\%16=13)\\ \&\&\text{HwRatio}<=1))?1:0 \tag{53}$$

or, $$\text{shiftHor}=((\text{angleIdx}+2)\%16<5\|((\text{angleIdx }\%16!=8)\\ \&\&\text{HwRatio}<1)\|((\text{angleIdx }\%16==3\|\text{angleIdx}\\ \%16==13)\&\&\text{HwRatio}==1))?1:0 \tag{54}$$

or, $$\text{shiftHor}=(\text{angleIdx }\%16==8\|((\text{angleIdx}+2)\\ \%16>4\&\&\text{HwRatio}>1)\|((\text{abs}(\text{dis}[\text{angleIdx}])==4)\\ \&\&\text{HwRatio}==1))?0:1 \tag{55}$$

or, $$\text{shiftHor}=((\text{angleIdx}+2)\%16<5|((\text{angleIdx }\%16!=8)\\ \&\&\text{HwRatio}<1)\|((\text{angleIdx }\%16==3\|\text{angleIdx}\\ \%16==13)\&\&\text{HwRatio}==1)) \tag{56}$$

or, $$\text{shiftHor}=((\text{angleIdx}+2)\%16<5\|((\text{angleIdx}\\ \%16==5\|\text{angleIdx }\%16==11)\&\&\text{HwRatio}<1)\|((\text{angleIdx }\%16==3\|\text{angleIdx }\%16==4\|\text{angleIdx}\\ \%16==12\|\text{angleIdx }\%16==13)\&\&\text{HwRatio}==\\ 1))?1:0 \tag{57}$$

or, $$\text{shiftHor}=(\text{angleIdx }\%16==8\|((\text{angleIdx}+2)\\ \%16>4\&\&\text{HwRatio}>1)\|((\text{angleIdx}\\ \%16==5\|\text{angleIdx }\%16==11)\&\&\text{HwRatio}==\\ 1))?0:1 \tag{58}$$

Further, in some implementations, by modifying the determination mode of the ShiftHor, the square or vertical rectangular blocks corresponding to the angles with angle index values of 2, 18, 14, 30 are enabled to move only in the horizontal direction, as shown in FIG. 11B.

In this case, it may be implemented by the following formula or its equivalent form, which is not specifically restricted in implementations of the present disclosure. Exemplarily, $$\text{shiftHor}=(\text{angleIdx }\%16==0\|\text{angleIdx}\\ \%16==2\|\text{angleIdx }\%16==14\|(\text{angleIdx}\\ \%16!=8\&\&\text{HwRatio}<=1))?1:0 \tag{59}$$

or, $$\text{shiftHor}=(\text{angleIdx }\%16==0\|\text{angleIdx}\\ \%16==2\|\text{angleIdx }\%16==14\|(\text{angleIdx}\\ \%16!=8\&\&\text{HwRatio}<=1)) \tag{60}$$

or, $$\text{shiftHor}=(\text{angleIdx }\%16<=2\|\text{angleIdx }\%16==14\|\\ (\text{angleIdx }\%16!=8\&\&\text{HwRatio}<=1)) \tag{61}$$

or, $$\text{shiftHor}=(\text{angleIdx }\%16<3\|\text{angleIdx }\%16==14\|(\text{angleIdx }\%16!=8\&\&\text{HwRatio}<=1)) \tag{62}$$

or, $$\text{shiftHor}=(\text{angleIdx }\%16<3\|\text{angleIdx }\%16>=14\|(\text{angleIdx }\%16!=8\&\&\text{HwRatio}<=1)) \tag{63}$$

or, $$\text{shiftHor}=(\text{angleIdx }\%16<3\|\text{angleIdx }\%16>13\|(\text{angleIdx }\%16!=8\&\&\text{HwRatio}<=1)) \tag{64}$$

or, $$\text{shiftHor}=((\text{angleIdx}+2)\%16<5\|(\text{angleIdx}\\ \%16!=8\&\&\text{HwRatio}<=1)) \tag{65}$$

or, $$\text{shiftHor}=((\text{angleIdx}+2)\%16<=4\|(\text{angleIdx }\%16!=8\&\\ \&\text{HwRatio}<=1)) \tag{66}$$

or, $$\text{shiftHor}=((\text{angleIdx}+2)\%16<5\|(\text{angleIdx }\%16!=8\&\\ \&\text{HwRatio}<=1))?1:0 \tag{67}$$

or, $$\text{shiftHor}=((\text{angleIdx}+2)\%16<=4\|(\text{angleIdx }\%16!=8\&\\ \&\text{HwRatio}<=1))?1:0 \tag{68}$$

or, $$\text{shiftHor}=(\text{angleIdx }\%16==8\|((\text{angleIdx}+2)\%16>4\&\\ \&\text{HwRatio}>1))?0:1 \tag{69}$$

or, $$\text{shiftHor}=(\text{angleIdx }\%16==8\|((\text{angleIdx}+2)\\ \%16>=5\&\&\text{HwRatio}>1))?0:1 \tag{70}$$

or, $$\text{shiftHor}=((\text{angleIdx}+13)\%16>10\|(\text{angleIdx} \%16!=8\&\&\text{HwRatio}<=1)) \quad (71)$$

or, $$\text{shiftHor}=((\text{angleIdx}+13)\%16>=11\|(\text{angleIdx} \%16!=8\&\&\text{HwRatio}<=1)) \quad (72)$$

or, $$\text{shiftHor}=((\text{angleIdx}+13)\%16>10\|(\text{angleIdx} \%16!=8\&\&\text{HwRatio}<=1))?1:0 \quad (73)$$

or, $$\text{shiftHor}=((\text{angleIdx}+13)\%16>=1\|(\text{angleIdx} \%16!=8\&\&\text{HwRatio}<=1))?1:0 \quad (74)$$

or, $$\text{shiftHor}=(\text{angleIdx }\%16==8\|((\text{angleIdx}+13) \%16<=10\&\&\text{HwRatio}>1))?0:1 \quad (75)$$

or, $$\text{shiftHor}=(\text{angleIdx }\%16==8\|((\text{angleIdx}+13) \%16<11\&\&\text{HwRatio}>1))?0:1 \quad (76)$$

Furthermore, the above calculation of the shiftHor can be equivalent to an implementation in a form of list. In other words, the value of shiftHor can also be obtained by looking up tables, such as a Table 9 or a Table 10.

Figure 11C:
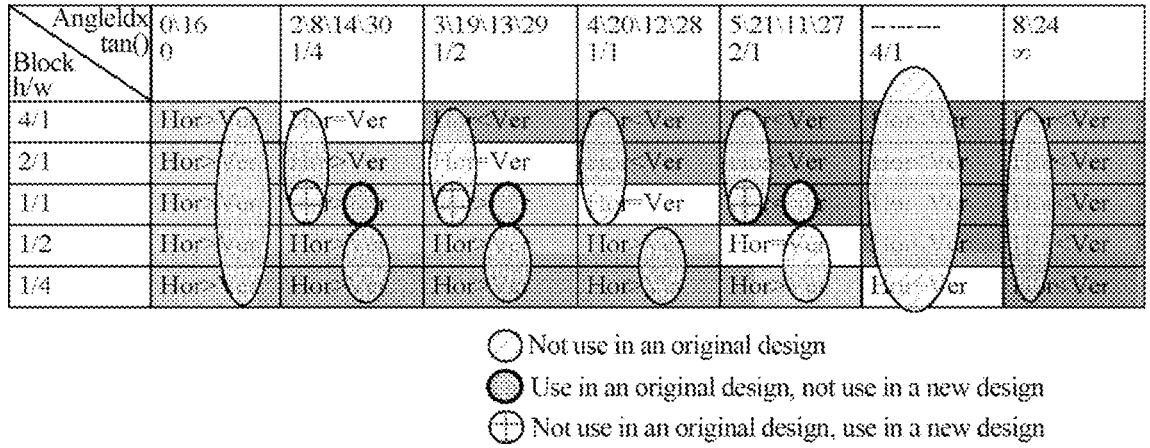
FIG. 11C is a schematic diagram of another yet correspondence between a block size, an angle index value, and a dividing line moving direction provided according to an implementation of the present disclosure.

Herein, according to a refinement in the formula (77), selection of a moving interval of the dividing line in the current block can also be improved overall, as shown in FIG. 11C.

In this way, on the encoder side, after the inter prediction value of at least one pixel in the current block is calculated, a residual corresponding to at least one pixel can be calculated according to a difference between the real value of at least one pixel in the current block and the inter prediction value, and the obtained residual can be signaled in a bitstream. In addition, after the partition mode index value is obtained, it is also necessary to signal the partition mode index value (denoted by merge_gpm_partition_idx) and reference position information (denoted by merge_gpm_idx0 [xCb] [yCb] and merge_gpm_idx1 [xCb] [yCb]) selected, respectively, for the two partitions in the merge list in the bitstream. The bitstream is then transmitted from the encoder side to the decoder side so that the bitstream is decoded on the decoder side.

A method for inter prediction is provided according to an implementation of the present disclosure, which is applied to an encoder. A prediction mode parameter is determined; when a prediction mode parameter of the current block indicates that the Geometrical Partition Mode (GPM) is used for determining the inter prediction value of the current block, an angle and a distance corresponding to the dividing line in the current block are determined, and an angle index value and a distance index value are respectively set to index serial numbers corresponding to the angle and the distance

TABLE 9

| | angleIdx | | | | | | | | | | | | |
|---|---|---|---|---|---|---|---|---|---|---|---|---|---|
| | 0~2 | 3~4 | 5 | 8 | 11 | 12~13 | 14~18 | 19~20 | 21 | 24 | 27 | 28~29 | 30 |
| hwRatio | — | >1 | >=1 | Arbitrary | >=1 | >1 | — | >1 | >=1 | Arbitrary | >=1 | >1 | — |
| shiftHor | 0 | 0 | 0 | 0 | 0 | 0 | 0 | 0 | 0 | 0 | 0 | 0 | 0 |
| | 0~2 | 3~4 | 5 | 8 | 11 | 12~13 | 14~18 | 19~20 | 21 | 24 | 27 | 28~29 | 30 |
| hwRatio | Arbitrary | <=1 | <1 | — | <1 | <=1 | Arbitrary | <=1 | <1 | — | <1 | <=1 | Arbitrary |
| shiftHor | 1 | 1 | 1 | 1 | 1 | 1 | 1 | 1 | 1 | 1 | 1 | 1 | 1 |

TABLE 10

| | angleIdx | | | | | | | | | | | | |
|---|---|---|---|---|---|---|---|---|---|---|---|---|---|
| | 0~2 | 3 | 4~5 | 8 | 11~12 | 13 | 14~18 | 19 | 20~21 | 24 | 27~28 | 29 | 30 |
| hwRatio | — | >1 | >=1 | Arbitrary | >=1 | 1 | — | >1 | >=1 | Arbitrary | >=1 | >1 | — |
| shiftHor | 0 | 0 | 0 | 0 | 0 | 0 | 0 | 0 | 0 | 0 | 0 | 0 | 0 |
| | 0~2 | 3 | 4~5 | 8 | 11~12 | 13 | 14~18 | 19 | 20~21 | 24 | 27~28 | 29 | 30 |
| hwRatio | Arbitrary | <=1 | <1 | — | <1 | <=1 | Arbitrary | <=1 | <1 | — | <1 | <=1 | Arbitrary |
| ShiftHor | 1 | 1 | 1 | 1 | 1 | 1 | 1 | 1 | 1 | 1 | 1 | 1 | 1 |

In addition, in some implementations, minimal changes may be made to the determination mode of the ShiftHor, that is, calculation of the height-width ratio (HwRatio) of the current block is the same as that in the original solution, which is as shown in the formula (23), and only the calculation of shiftHor is modified as follows, $$\text{shiftHor}=((\text{angleIdx }\%16==8)\|(\text{angleIdx} \%16!=0\&\&\text{HwRatio}>1))?0:1 \quad (77)$$

in a preset mapping table; based on size information of the current block and the angle index value, a value of a shifting direction indicator of the current block is determined by a preset model, wherein, the value of a shifting direction indicator is used for indicating shifting directions of different dividing lines of the current block at the angles; based on the value of a shifting direction indicator and the distance index value, inter prediction is performed on the current block. In this way, a calculation process for a value of a shifting direction indicator is simplified by using the preset model, and the calculation complexity is reduced. In addition, moving directions of dividing lines in the block with different sizes at partial angles in the GPM prediction mode can be refined, which leads to more uniform and sparse distribution of the dividing lines in all block sizes, and a problem of performance loss caused by extreme dense distribution of the dividing lines under the GPM prediction mode is solved, thus improving the codec performance and achieving a purpose of improving the codec efficiency.

Figure 12:
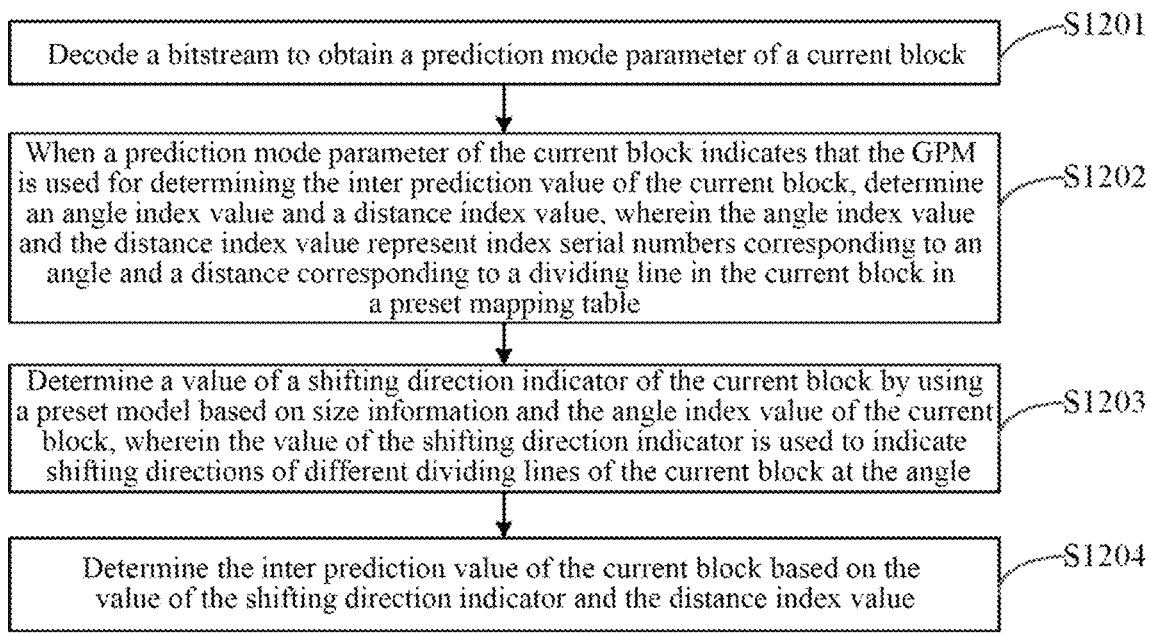
FIG. 12 is a flowchart of another method for inter prediction provided according to an implementation of the present disclosure.

Based on an example of an application scenario of FIG. 4B above, referring to FIG. 12, it shows an example flowchart of a method for inter prediction provided according to another implementation of the present disclosure. As shown in FIG. 12, the method may include following acts S1201 to S1204.

In act S1201, a bitstream is decoded to obtain a prediction mode parameter of a current block.

It should be noted that the method is applied to a decoder. On the decoder side, a video picture can also be divided into a plurality of picture blocks, and each picture block to be decoded currently can be a CB. Herein, the current block specifically refers to a decoding block in which decoding prediction is to be performed currently on a first color component, a second color component or a third color component in a video picture.

It should also be noted that the prediction mode parameter indicates a prediction mode employed by the current block and a parameter related to the mode. Wherein, the prediction modes usually include the inter prediction mode, a traditional intra prediction mode and a non-traditional intra prediction mode, and the inter prediction modes include a traditional inter prediction mode and the GPM prediction mode. In other words, the encoder selects an optimal prediction mode to perform precoding on the current block, and in this process, the prediction mode of the current block may be determined, a corresponding prediction mode parameter is signaled in a bitstream, and transmitted by the encoder to a decoder.

Thus, on the decoder side, the prediction mode parameter of the current block can be obtained by decoding the bitstream, and whether the current block uses the GPM prediction mode can be determined according to the obtained prediction mode parameter.

In act S1202, when a prediction mode parameter of the current block indicates that the Geometrical Partition Mode (GPM) is used for determining an inter prediction value of the current block, an angle index value and a distance index value are determined, wherein, the angle index value and the distance index value represent index serial numbers corresponding to an angle and a distance corresponding to a dividing line in the current block in a preset mapping table.

It should be noted that if the prediction mode parameter indicates that the current block uses the GPM prediction mode, it is necessary to continue decoding the bitstream to obtain the angle index value and distance index value of the current block. Specifically, in act S1202, when the prediction mode parameter indicates that the GPM is used for determining the inter prediction value of the current block, the method may further include:

decoding a bitstream to obtain a partition mode index value of the current block.

Accordingly, determining the angle index value and the distance index value includes:

inquiring an angle index value and a distance index value corresponding to the partition mode index value from a preset mapping table based on the partition mode index value, wherein, the preset mapping table is used to indicate a relationship between the partition mode index value, the angle index value and the distance index; and determining the inquired angle index value and distance index value as the angle index value and the distance index value.

In other words, when the prediction mode parameter indicates that the current block uses the GPM prediction mode, the bitstream can be further decoded to obtain the partition mode index value (denoted by merge_gpm_partition_idx) of the current block. Combined with the preset mapping table shown in Table 1, the corresponding angle index value (denoted by angleIdx) and distance index value (denoted by distanceIdx) can be obtained by looking up the table.

In act S1203, based on size information and the angle index value of the current block, a value of a shifting direction indicator of the current block is determined using a preset model; wherein, the value of a shifting direction indicator is used to indicate shifting directions of different dividing lines of the current block at the angle.

It should be noted that when the current block is determined, the size information of the current block, such as the height and the width of the current block, can be obtained. In this way, according to the size information and the angle index value of the current block, a value of a shifting direction indicator of the current block can be calculated, which can be denoted by shiftHor.

Specifically, in some implementations, for the act S1203, determining the value of a shifting direction indicator of the current block by using the preset model based on the size information and the angle index value of the current block may include:

determining a first refinement value according to the angle index value;

using the first refinement value to shift the height of the current block to obtain a shifted height;

using a preset offset value to shift the width of the current block to obtain a shifted width;

comparing the shifted height with the shifted width; and obtaining a value of a shifting direction indicator of the current block according to a result of comparison.

Furthermore, in some implementations, after obtaining the shifted height, the method may further include:

performing a ratio operation on the shifted height and the width of the current block to obtain a height-width ratio of the current block;

comparing the height-width ratio of the current block with a preset ratio; and obtaining a value of a shifting direction indicator of the current block according to a result of comparison.

Furthermore, in some implementations, after determining the first refinement value according to the angle index value, the method may further include:

performing logarithmic operation on the width and the height of the current block respectively to obtain a logarithmic value of the width and a logarithmic value of the height;

calculating a difference between the logarithm value of the width and the logarithm value of the height;

adding the calculated difference and a first preset value to obtain a second refinement value;

comparing the second refinement value with the first refinement value; and obtaining a value of a shifting direction indicator of the current block according to a result of comparison.

Optionally, in some implementations, after determining the first refinement value according to the angle index value, the method may further include:
  using a preset offset value to shift the height of the current block to obtain a shifted height;
  performing a ratio operation on the shifted height and the width of the current block to obtain a height-width ratio of the current block;
  using a first refinement value to shift a second preset value to obtain a shifted refinement value;
  comparing the shifted refinement value with the height-width ratio of the current block; and
  obtaining a value of a shifting direction indicator of the current block according to a result of comparison.

Furthermore, in some implementations, determining the first refinement value based on the angle index value may include:
  using the angle index value to perform modulo operation on a third preset value to obtain a modulus result; and
  comparing the modulus result with a fourth preset value, and determining the first refinement value according to a result of comparison.

Furthermore, in some implementations, calculating the first refinement value based on the angle index value may include:
  searching for a logarithmic value corresponding to the angle index value from a first look-up table based on the angle index value; and
  determining a searched-out logarithmic value as the first refinement value.

Furthermore, the value of a shifting direction indicator of the current block, i.e. whether the dividing line within the current block moves in the horizontal direction or in the vertical direction, can also be determined by a look-up table. In some implementations, for the act S1203, determining the value of a shifting direction indicator of the current block by using the preset model based on the size information and the angle index value of the current block may include:
  searching for a shifting indication value corresponding to the angle index value from a second look-up table based on the angle index value;
  comparing a searched-out shifting indication value with a preset judgment result; and
  obtaining the value of a shifting direction indicator of the current block according to a comparison result, wherein, the preset judgment result is obtained by judging whether the height of the current block is greater than the width of the current block.

Furthermore, in an implementation of the present disclosure, the value of a shifting direction indicator of the current block, i.e. the moving direction of the dividing line in the current block, can also be determined by only considering the angle index value of the current block, without considering the size information of the current block. In some implementations, for the act S1203, determining the value of a shifting direction indicator of the current block by using the preset model based on the size information and the angle index value of the current block may include:
  adding the angle index value and a fifth preset value to obtain an addition result;
  using the addition result to perform modulo operation on a sixth preset value to obtain a modulus result;
  comparing the modulus result with a seventh preset value; and
  obtaining a value of a shifting direction indicator of the current block according to a result of comparison.

Further, in some implementations, the method may further include:
  if the value of a shifting direction indicator is equal to 1, determining that the shifting direction of the dividing line of the current block at the angle is the horizontal direction; and
  if the value of a shifting direction indicator is equal to 0, determining that the shifting direction of the dividing line of the current block at the angle is the vertical direction.

In other words, if the value of shiftHor is 1, the shifting direction of the dividing line of the current block at this angle is the horizontal direction, that is, the dividing line will shift on the X axis; if the value of shiftHor is 0, the shifting direction of the dividing line of the current block at this angle is the vertical direction, that is, the dividing line will shift on the Y axis.

In act S1204, the inter prediction value of the current block is determined based on the value of a shifting direction indicator and the distance index value.

It should be noted that after obtaining the value of a shifting direction indicator and the distance index value, a target dividing line and offset information of the current block can be determined to calculate the inter prediction value of the current block. Specifically, in some implementations, determining the inter prediction value of the current block based on the value of a shifting direction indicator and the distance index value may include:
  determining a target dividing line and offset information of the current block based on the value of a shifting direction indicator and the distance index value;
  determining a first prediction value of a first partition of the current block and a second prediction value of a second partition of the current block based on division of the current block by the target dividing line;
  calculating a weight matrix of the current block according to the offset information;
  and
  weighting pixel points in the current block using the first prediction value, the second prediction value and the weight matrix to obtain an inter prediction value of the current block.

Understandably, in the GPM prediction mode, after the value of a shifting direction indicator and the distance index value are determined, a target dividing line of the current block can be obtained for dividing the current block into a first partition and a second partition (i.e., a partition A and a partition B). After the two partitions are determined, it is necessary to calculate a unidirectional prediction value of each of the two partitions.

Herein, for the GPM prediction mode, an existing conventional merge list can be reused and a unidirectional merge list pertain to the GPM is constructed in a parity check mode, so that candidate my information of each of the two partitions partitioned with the GPM is selected from the unidirectional merge list. Since the bitstream transmitted by the encoder includes reference position information (denoted by merge_gpm_idx0 [xCb] [yCb] and merge_gpm_idx1 [xCb] [yCb]) selected, respectively, for the partition A and the partition B in the merge list, the merge_gpm_idx0 [xCb] [yCb] can also be obtained by decoding the bitstream, indicating a position of an my of the partition A in the merge list, let m=merge_gpm_idx0 [xCb] [yCb]; the merge_gpm_idx1 [xCb] [yCb] can also be obtained by decoding the bitstream, indicating an position of an my of the partition B in the merge list. Since the position of the my of the partition B in the merge list may be reduced by 1 because the partition A selects an option in a front position first, that is, let n=merge_gpm_idx1 [xCb] [yCb]+ (merge_gpm_idx1 [xCb][yCb]>=m)? 1:0, wherein n represents an actual position of an my selected by the partition B in the merge list. It should be noted that motion estimation is not necessary on the decoder side, and after the m and the n are obtained, subsequent processing steps are the same as those on the encoder side and will not be described in detail herein.

Thus, in conjunction with an example of an overall architecture of a processing flow of a GPM prediction shown in FIG. 7, after determining the first prediction value of the first partition of the current block and the second prediction value of the second partition of the current block, the weight matrix of the current block can also be calculated according to the offset information; then the first predictive value, the second predictive value and the weight matrix are used to weight and merge each pixel point in the current block, and the inter prediction value of the current block can be obtained.

A method for inter prediction is provided according to an implementation of the present disclosure, which is applied to a decoder. By decoding a bitstream, a prediction mode parameters of the current block is obtained; when a prediction mode parameter of the current block indicates that the Geometrical Partition Mode (GPM) is used for determining the inter prediction value of the current block, an angle index value and a distance index value are determined, wherein, the angle index value and the distance index value represent index serial numbers corresponding to an angle and a distance corresponding to a dividing line in the current block in a preset mapping table; based on size information and the angle index value of the current block, a value of a shifting direction indicator of the current block is determined by using a preset model, wherein, the value of a shifting direction indicator is used to indicate shifting directions of different dividing lines of the current block at the angle; and the inter prediction value of the current block is determined based on the value of a shifting direction indicator and the distance index value. In this way, a calculation process for the value of a shifting direction indicator is simplified by using the preset model, and the calculation complexity is reduced. In addition, moving directions of dividing lines in the block with different sizes at partial angles in the GPM prediction mode can be refined, which leads to more uniform and sparse distribution of the dividing lines in all block sizes, and a problem of performance loss caused by extreme dense distribution of the dividing lines under the GPM prediction mode is solved, thus improving the codec performance and achieving a purpose of improving the codec efficiency.

Figure 13:
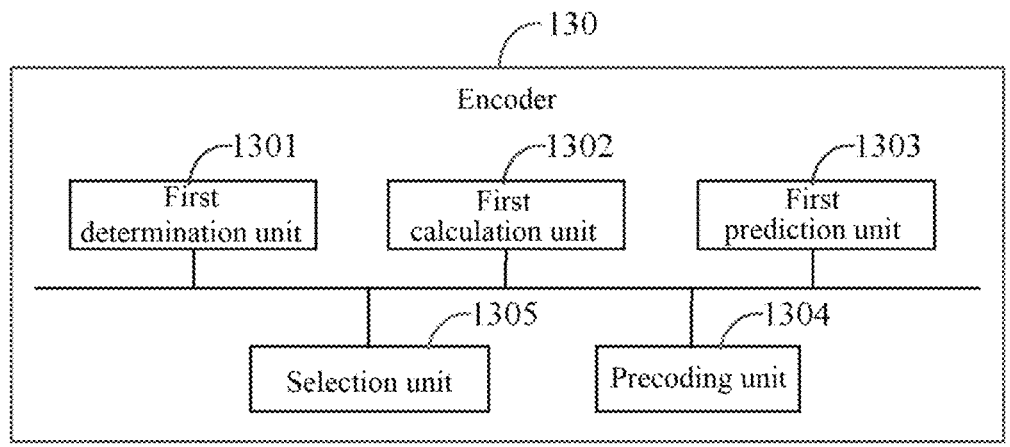
FIG. 13 is a schematic diagram of a composition of an encoder provided according to an implementation of the present disclosure.

Based on the same inventive concept as the foregoing implementations, referring to FIG. 13, a schematic diagram of a structure of an encoder 130 provided according to an implementation of the present disclosure is shown. As shown in FIG. 13, the encoder 130 may include a first determination unit 1301, a first calculation unit 1302, and a first prediction unit 1303.

The first determination unit 1301 is configured to determine a prediction mode parameter of a current block. The first determination unit 1301 is further configured to, when the prediction mode parameter indicates that a Geometrical Partition Mode (GPM) is used to determine an inter prediction value of the current block, determine an angle and a distance corresponding to a dividing line in the current block, and set, respectively, an angle index value and a distance index value to index serial numbers corresponding to the angle and the distance in a preset mapping table.

The first calculation unit 1302 is configured to determine a value of a shifting direction indicator of the current block by using a preset model based on size information and the angle index value of the current block; wherein, the value of a shifting direction indicator is used to indicate shifting directions of different dividing lines of the current block at the angle.

The first prediction unit 1303 is configured to perform inter prediction on the current block based on the value of a shifting direction indicator and the distance index value.

In some implementations, the size information of the current block includes the height and the width of the current block. The first calculation unit 1302 is specifically configured to determine a first refinement value according to the angle index value; use the first refinement value to shift the height of the current block to obtain a shifted height; use a preset offset value to shift the width of the current block to obtain a shifted width; compare the shifted height with the shifted width; and obtain a value of a shifting direction indicator of the current block according to a result of comparison.

In some implementations, the first calculation unit 1302 is further configured to perform a ratio operation on the shifted height and the width of the current block to obtain a height-width ratio of the current block; compare the height-width ratio of the current block with a preset ratio; and obtain a value of a shifting direction indicator of the current block according to a result of comparison.

In some implementations the first calculation unit 1302 is further configured to perform logarithmic operation on the width and the height of the current block respectively to obtain a logarithmic value of the width and a logarithmic value of the height; calculate a difference between the logarithm value of the width and the logarithm value of the height; add the calculated difference and a first preset value to obtain a second refinement value; compare the second refinement value with the first refinement value; and obtain a value of a shifting direction indicator of the current block according to a result of comparison.

In some implementations, the first calculation unit 1302 is further configured to use a preset offset value to shift the height of the current block to obtain a shifted height; perform a ratio operation on the shifted height and the width of the current block to obtain a height-width ratio of the current block; use a first refinement value to shift a second preset value to obtain a shifted refinement value; compare the shifted refinement value with the height-width ratio of the current block; and obtain a value of a shifting direction indicator of the current block according to a result of comparison.

In some implementations, the first calculation unit 1302 is further configured to use the angle index value to perform modulo operation on a third preset value to obtain a modulus result; compare the modulus result with a fourth preset value, and determine the first refinement value according to a result of comparison.

In some implementations the first calculation unit 1302 is further configured to search for a logarithmic value corresponding to the angle index value from a first look-up table based on the angle index value; and determine a searched-out logarithmic value as the first refinement value.

In some implementations the first calculation unit 1302 is further configured to search for a shifting indication value corresponding to the angle index value from a second look-up table based on the angle index value; compare a searched-out shifting indication value with a preset judgment result; and obtain a value of a shifting direction indicator of the current block according to a result of comparison; wherein, the preset judgment result is obtained by judging whether the height of the current block is greater than the width of the current block.

In some implementations, the first calculation unit 1302 is further configured to add the angle index value and a fifth preset value to obtain an addition result; use the addition result to perform modulo operation on a sixth preset value to obtain a modulus result; compare the modulus result with a seventh preset value; and obtain a value of a shifting direction indicator of the current block according to a result of comparison.

In some implementations, the first determination unit 1301 is further configured to determine that the shifting direction of the dividing line of the current block at the angle is the horizontal direction if the value of a shifting direction indicator is equal to 1; and determine that the shifting direction of the dividing line of the current block at the angle is the vertical direction if the value of a shifting direction indicator is equal to 0.

In some implementations, referring to FIG. 13, the encoder 130 may further include a precoding unit 1304 and a selection unit 1305.

The precoding unit 1304 is configured to perform precoding on the current block by using a plurality of prediction modes to obtain a rate distortion cost value corresponding to each prediction mode.

The selection unit 1305 is configured to select a minimum rate distortion cost value from a plurality of obtained rate distortion cost values, and determine a prediction mode corresponding to the minimum rate distortion cost value as the prediction mode parameter of the current block.

In some implementations the first determination unit 1301 further configured to determine a partition mode of the current block; and determine the index value of the partition mode to be the index serial number corresponding to the partition mode in the preset mapping table and signal the index value in a bitstream; wherein, the preset mapping table is used to indicate a relationship between the partition mode index value, the angle index value and the distance index.

In some implementations, the first determination unit 1301 is further configured to determine a target dividing line and offset information of the current block based on the value of a shifting direction indicator and the distance index value; and determine a first prediction value of a first partition of the current block and a second prediction value of a second partition of the current block based on division of the current block by the target dividing line.

The first calculation unit 1302 is further configured to calculate a weight matrix of the current block according to the offset information.

The first prediction unit 1303 is specifically configured to weight pixel points in the current block using the first prediction value, the second prediction value and the weight matrix, to obtain an inter prediction value of the current block.

It may be understood that, in an implementation of the present disclosure, a "unit" may be a portion of a circuit, a portion of a processor, a portion of a program or software, etc.; it, of course, may be a module, or may be non-modular. In addition, various components in this implementation may be integrated into one processing unit, or various units may exist physically separately, or two or more than two units may be integrated into one unit. The integrated unit may be implemented in a form of hardware, or may be implemented in a form of a software functional module.

The integrated unit, if implemented in the form of a software functional module and sold or used as an independent product, may be stored in a computer readable storage medium. Based on such understanding, the technical solutions of the implementations, in essence, or a part contributing to the prior art, or all or part of the technical solutions, may be embodied in a form of a software product, and the computer software product is stored in a storage medium, and includes several instructions for enabling a computer device (which may be a personal computer, a server, or a network device, etc.) or a processor to perform all or part of the acts of the methods in the implementations. The aforementioned storage medium includes various media, such as a U disk, a mobile hard disk, a Read Only Memory (ROM), a Random Access Memory (RAM), a magnetic disk, or an optical disk, which are capable of storing program codes.

Therefore, a computer storage medium is provided according to an implementation of the present disclosure, which is applied to the encoder 130. The computer storage medium stores an inter prediction program, and when the inter prediction program is executed by a first processor, the method according to any one of the aforementioned implementations is implemented.

Figure 14:
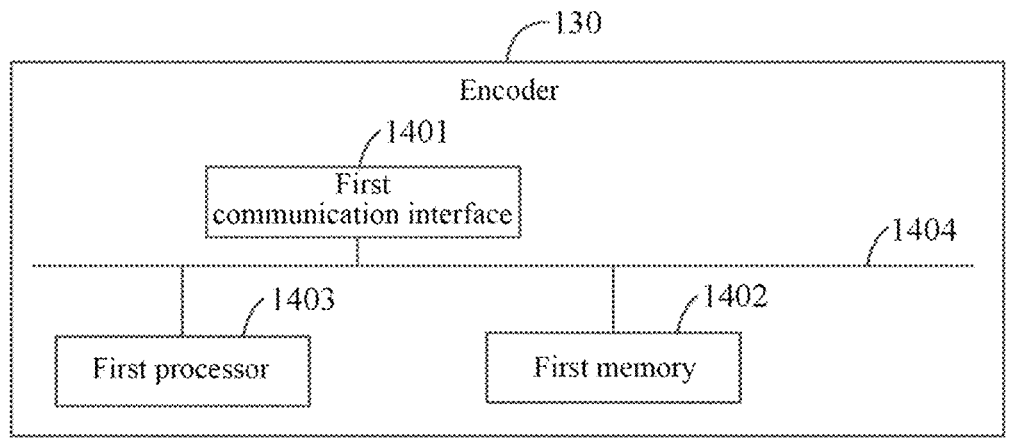
FIG. 14 is a schematic diagram of a specific hardware structure of an encoder provided according to an implementation of the present disclosure.

Based on the composition of the encoder 130 and the computer storage medium described above, referring to FIG. 14, it shows an example of a specific hardware structure of an encoder 130 according to an implementation of the present disclosure, which may include a first communication interface 1401, a first memory 1402, and a first processor 1403 which are coupled together through a first bus system 1404. It may be understood that the first bus system 1404 is used for implementing connection and communication between these components. In addition to a data bus, the first bus system 1404 further includes a power bus, a control bus, and a status signal bus. However, for the sake of clarity, various buses are all labeled as the first bus system 1404 in FIG. 14.

The first communication interface 1401 is configured to receive and send signals in a process of sending and receiving information with other external network elements.

The first memory 1402 is configured to store a computer program runnable on the first processor 1403.

The first processor 1403 is configured to, when running the computer program,
  determine a prediction mode parameter of a current block;
  when the prediction mode parameter indicates that a Geometrical Partitioning Mode (GPM) is used to determine an inter prediction value of the current block, determine an angle and a distance corresponding to a dividing line in the current block, and set an angle index value and a distance index value to index serial numbers corresponding to the angle and the distance in a preset mapping table respectively;
  determine a value of a shifting direction indicator of the current block by using a preset model based on size information and the angle index value of the current block, wherein, the value of a shifting direction indicator is used to indicate shifting directions of different dividing lines of the current block at the angle; and
  perform inter prediction on the current block based on the value of a shifting direction indicator and the distance index value.

It may be understood that the first memory 1402 in an implementation of the present disclosure may be a volatile memory or a non-volatile memory, or may include both the volatile memory and the non-volatile memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. Through exemplary but non-restrictive description, many forms of RAMs may be available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDR SDRAM), an Enhanced Synchronous Dynamic Random Access Memory (ESDRAM), a SynchLink Dynamic Random Access Memory (SLDRAM), and a Direct Rambus Random Access Memory (DRRAM). The first memory 1402 in the systems and methods described in the present disclosure is intended to include, but not be limited to, these and any other suitable types of memories.

The first processor 1403 may be an integrated circuit chip having a signal processing capability. In an implementation process, various acts of the foregoing methods may be completed through an integrated logic circuit of hardware in the first processor 1403 or instructions in a form of software. The first processor 1403 described above may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The processor may implement various methods, acts, and logic block diagrams disclosed in the implementations of the present disclosure. The general purpose processor may be a microprocessor or the processor may be any conventional processor or the like. The acts of the methods disclosed in connection with the implementations of the present disclosure may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in the first memory 1402, and the first processor 1403 reads information in the first memory 1402 and completes the acts of the foregoing methods in combination with its hardware.

It may be understood that these implementations described in the present disclosure may be implemented by hardware, software, firmware, middleware, microcode, or a combination thereof. For the implementation by hardware, a processing unit may be implemented in one or more application specific integrated circuits (ASICs), digital signal processors (DSPs), DSP Devices (DSPDs), programmable logic devices (PLDs), field programmable gate arrays (FPGAs), general purpose processors, controllers, microcontrollers, microprocessors, other electronic modules for performing the functions described in the present disclosure, or combinations thereof. For an implementation by software, techniques described in the present disclosure may be implemented through modules (e.g., processes, functions) that perform the functions described in the present disclosure. Software codes may be stored in a memory and performed by a processor. The memory may be implemented in the processor or external to the processor.

Optionally, as another implementation, the first processor 1403 is further configured to perform the method according to any one of the aforementioned implementations when running the computer program.

An encoder is provided according to an implementation of the present disclosure, which may include a first determination unit, a first calculation unit and a first prediction unit. In this encoder, a calculation process for a value of a shifting direction indicator is simplified by using the preset model, and the calculation complexity is reduced. In addition, moving directions of dividing lines in the block with different sizes at partial angles in the GPM prediction mode can be refined, which leads to more uniform and sparse distribution of the dividing lines in all block sizes, and a problem of performance loss caused by extreme dense distribution of the dividing lines under the GPM prediction mode is solved, thus improving the codec performance and achieving a purpose of improving the codec efficiency.

Figure 15:
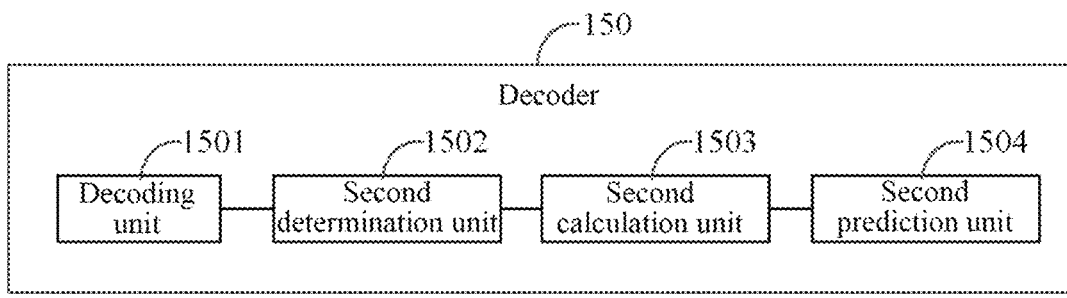
FIG. 15 is a schematic diagram of a composition of a decoder provided according to an implementation of the present disclosure.

Based on the same inventive concept as the foregoing implementations, referring to FIG. 15, a schematic diagram of a structure of a decoder 150 provided according to an implementation of the present disclosure is shown. As shown in FIG. 15, the decoder 150 may include a decoding unit 1501, a second determination unit 1502, a second calculation unit 1503 and a second prediction unit 1504.

The decoding unit 1501 is configured to decode a bitstream to obtain a prediction mode parameter of a current block.

The second determining unit 1502 is configured to, when a prediction mode parameter of the current block indicates that the Geometrical Partition Mode (GPM) is used for determining the inter prediction value of the current block, determine an angle index value and a distance index value, wherein, the angle index value and the distance index value represent corresponding index serial numbers of an angle and a distance corresponding to a dividing line in the current block in a preset mapping table.

The second calculation unit 1503 is configured to determine a value of a shifting direction indicator of the current block by using a preset model based on size information and the angle index value of the current block, wherein, the value of a shifting direction indicator is used to indicate shifting directions of different dividing lines of the current block at the angle.

The second prediction unit 1504 is configured to determine the inter prediction value of the current block based on the value of a shifting direction indicator and the distance index value.

In some implementations, the decoding unit 1501 is further configured to decode a bitstream to obtain a partition mode index value of the current block.

Accordingly, the second determination unit 1502 is specifically configured to inquire an angle index value and a distance index value corresponding to the partition mode index value from a preset mapping table based on the partition mode index value, wherein, the preset mapping table is used to indicate a relationship between the partition mode index value, the angle index value and the distance index; and determine the inquired angle index value and distance index value as the angle index value and the distance index value of the current block.

In some implementations, the size information of the current block includes the height and the width of the current block; the second calculation unit 1503 is specifically configured to determine a first refinement value according to the angle index value; use the first refinement value to shift the height of the current block to obtain a shifted height; use a preset offset value to shift the width of the current block to obtain a shifted width; compare the shifted height with the shifted width; and obtain a value of a shifting direction indicator of the current block according to a result of comparison.

In some implementations, the second calculation unit 1503 is further configured to perform a ratio operation on the shifted height and the width of the current block to obtain a height-width ratio of the current block; compare the height-width ratio of the current block with a preset ratio; and obtain a value of a shifting direction indicator of the current block according to a result of comparison.

In some implementations the second calculation unit 1503 is further configured to perform logarithmic operation on the width and the height of the current block respectively to obtain a logarithmic value of the width and a logarithmic value of the height; calculate a difference between the logarithm value of the width and the logarithm value of the height; add the calculated difference and a first preset value to obtain a second refinement value; compare the second refinement value with the first refinement value; and obtain a value of a shifting direction indicator of the current block according to a result of comparison.

In some implementations, the second calculation unit 1503 is further configured to use a preset offset value to shift the height of the current block to obtain a shifted height; perform a ratio operation on the shifted height and the width of the current block to obtain a height-width ratio of the current block; use a first refinement value to shift a second preset value to obtain a shifted refinement value; compare the shifted refinement value with the height-width ratio of the current block; and obtain a value of a shifting direction indicator of the current block according to a result of comparison.

In some implementations, the second calculation unit 1503 is further configured to use the angle index value to perform modulo operation on a third preset value to obtain a modulus result; compare the modulus result with a fourth preset value, and determine the first refinement value according to a result of comparison.

In some implementations the second calculation unit 1503 is further configured to search for a logarithmic value corresponding to the angle index value from a first look-up table based on the angle index value; and determine a searched-out logarithmic value as the first refinement value.

In some implementations, the second calculation unit 1503 is further configured to search for a shifting indication value corresponding to the angle index value from a second look-up table based on the angle index value; compare a searched-out shifting indication value with a preset judgment result; and obtain a value of a shifting direction indicator of the current block according to a result of comparison, wherein, the preset judgment result is obtained by judging whether the height of the current block is greater than the width of the current block.

In some implementations, the second calculation unit 1503 is further configured to add the angle index value and a fifth preset value to obtain an addition result; use the addition result to perform modulo operation on a sixth preset value to obtain a modulus result; compare the modulus result with a seventh preset value; and obtain a value of a shifting direction indicator of the current block according to a result of comparison.

In some implementations, the second determination unit 1502 is further configured to determine that the shifting direction of the dividing line of the current block at the angle is the horizontal direction if the value of a shifting direction indicator is equal to 1; and determine that the shifting direction of the dividing line of the current block at the angle is the vertical direction if the value of a shifting direction indicator is equal to 0.

In some implementations, the second determination unit 1502 is further configured to determine a target dividing line and offset information of the current block based on the value of a shifting direction indicator and the distance index value; and determine a first prediction value of a first partition of the current block and a second prediction value of a second partition of the current block based on division of the current block by the target dividing line.

The second calculation unit 1503 is further configured to calculate a weight matrix of the current block according to the offset information.

The second prediction unit 1504 is specifically configured to use the first prediction value, the second prediction value and the weight matrix to weight pixel points in the current block to obtain an inter prediction value of the current block.

It may be understood that, in this implementation, a "unit" may be a portion of a circuit, a portion of a processor, a portion of a program or software, etc., or, of course, may be a module, or may be non-modular. In addition, various components in this implementation may be integrated into one processing unit, or various units may exist physically separately, or two or more than two units may be integrated into one unit. The integrated unit may be implemented in a form of hardware, or may be implemented in a form of a software functional module.

The integrated unit, if implemented in the form of the software functional module and sold or used as an independent product, may be stored in a computer-readable storage medium. Based on this understanding, a computer storage medium is provided according to an implementation of the present implementation, which is applied to for application to the decoder 150. The computer storage medium stores an inter prediction program, and when the inter prediction program is executed by a second processor, the method according to any one of the aforementioned implementations is implemented.

Figure 16:
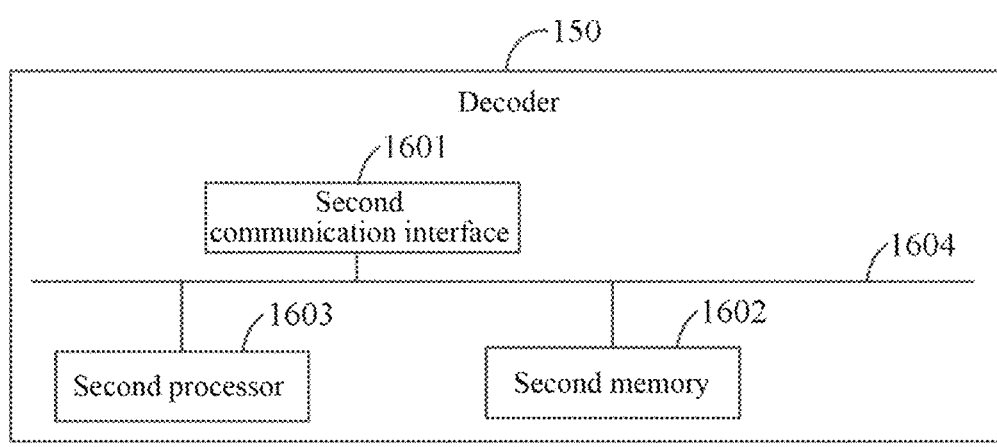
FIG. 16 is a schematic diagram of a specific hardware structure of a decoder provided according to an implementation of the present disclosure.

Based on the composition of the decoder 150 and the computer storage medium described above, referring to FIG. 16, it shows a specific hardware structure of a decoder 150 according to an implementation of the present disclosure. The decoder 100 may include a second communication interface 1601, a second memory 1602, and a second processor 1603 which are coupled together through a second bus system 1604. It may be understood that the second bus system 1604 is used for implementing connection and communication between these components. In addition to a data bus, the second bus system 1604 further includes a power bus, a control bus, and a status signal bus. However, for the sake of clarity, various buses are all labeled as the second bus system 1604 in FIG. 16.

The second communication interface 1601 is configured to receive and send signals in a process of sending and receiving information with other external network elements.

The second memory 1602 is configured to store a computer program runnable on the second processor 1603.

The second processor 1603 is configured to, when running the computer program,
  decode a bitstream to obtain a prediction mode parameter of a current block;
  when a prediction mode parameter of the current block indicates that the Geometrical Partition Mode (GPM) is used for determining the inter prediction value of the current block, determine an angle index value and a distance index value; wherein, the angle index value and the distance index value represent index serial numbers corresponding to an angle and a distance corresponding to a dividing line in the current block in a preset mapping table;

determine a value of a shifting direction indicator of the current block by using a preset model based on size information and the angle index value of the current block, wherein, the value of a shifting direction indicator is used to indicate shifting directions of different dividing lines of the current block at the angle; and determine the inter prediction value of the current block based on the value of a shifting direction indicator and the distance index value.

Optionally, as another implementation, the second processor 1603 is further configured to perform the method according to any one of the aforementioned implementations when running the computer program.

It may be understood that hardware function of the second memory 1602 is similar to that of the first memory 1402, and the hardware function of the second processor 1603 is similar to that of the first processor 1403, which will not be repeated here.

A decoder is provided according to an implementation of the present disclosure, which may include a decoding unit, a second determination unit, a second calculation unit, and a second prediction unit. In this decoder, a calculation process for a value of a shifting direction indicator is simplified by using the preset model, and the calculation complexity is reduced. In addition, moving directions of dividing lines in the block with different sizes at partial angles in the GPM prediction mode can be refined, which leads to more uniform and sparse distribution of the dividing lines in all block sizes, and a problem of performance loss caused by extreme dense distribution of the dividing lines under the GPM prediction mode is solved, thus improving the codec performance and achieving a purpose of improving the codec efficiency.

It should be noted that in the present disclosure, the terms "include", "contain" or any other variations thereof are intended to cover a non-exclusive inclusion, such that a process, method, article, or apparatus that includes a series of elements includes not only those elements but also other elements which are not expressly listed, or further includes elements inherent in such a process, method, article, or apparatus. An element defined by a statement "include one . . . " does not exclude presence of additional identical elements in the process, method, article or system that includes the element, without more limitations.

The above-mentioned serial numbers of the implementations of the present disclosure are only for description, but do not represent superiority and inferiority of the implementations.

The methods disclosed in several method implementations provided in the present disclosure may be combined with each other randomly if there is no conflict, to obtain new method implementations.

Features disclosed in several product implementations provided in the present disclosure may be combined with each other randomly if there is no conflict, to obtain new product implementations.

Features disclosed in several method or device implementations provided in the present disclosure may be combined with each other randomly if there is no conflict, to obtain new method implementations or device implementations.

The foregoing are merely specific implementations of the present disclosure, but the protection scope of the present disclosure is not limited thereto. Any person skilled in the art may readily conceive variations or substitutions within the technical scope disclosed by the present disclosure, which should be included within the protection scope of the present disclosure. Therefore, the protection scope of the present disclosure shall be subject to the protection scope of the claims.

INDUSTRIAL APPLICABILITY

In an implementation of the present disclosure, when a prediction mode parameter of a current block indicates that the GPM is used for determining an inter prediction value of the current block, a value of a shifting direction indicator of the current block can be calculated by using a preset model, and then the inter prediction value of the current block can be determined. In this way, a calculation process for a value of a shifting direction indicator is simplified by using the preset model, and the calculation complexity is reduced. In addition, moving directions of dividing lines in the block with different sizes at partial angles in the GPM prediction mode can be refined, which leads to more uniform and sparse distribution of the dividing lines in all block sizes, and a problem of performance loss caused by extreme dense distribution of the dividing lines under the GPM prediction mode is solved, thus improving the codec performance and achieving a purpose of improving the codec efficiency.

What is claimed is:

1. A method for inter prediction, applied to an encoder, comprising:

determining a prediction mode parameter of a current block;

when the prediction mode parameter indicates that a Geometrical Partitioning Mode (GPM) is used for determining an inter prediction value of the current block, determining a dividing angle and a distance in the current block, and setting an angle index value and a distance index value to index serial numbers corresponding to the angle and the distance in a preset mapping table respectively;

determining a value of a shifting direction indicator of the current block by using a preset model based on size information and the angle index value of the current block, wherein, the value of a shifting direction indicator is used for indicating shifting directions of different dividing lines of the current block at the angle; wherein the size information of the current block comprises a height and a width of the current block, and determining the value of a shifting direction indicator of the current block by using the preset model based on the size information and the angle index value of the current block comprises:

determining a first refinement value according to the angle index value;

obtaining a shifted height according to the first refinement value and the height of the current block;

obtaining a shifted width according to a preset offset value and the width of the current block; and obtaining the value of the shifting direction indicator of the current block according to a size of the shifted height and a size of the shifted width; and performing inter prediction on the current block based on the value of the shifting direction indicator and the distance index value.

2. The method of claim 1, wherein determining the value of a shifting direction indicator of the current block by using the preset model based on the size information and the angle index value of the current block further comprises:

searching for a shifting indication value corresponding to the angle index value from a second look-up table based on the angle index value;

comparing a searched-out shifting indication value with a preset judgment result; and obtaining the value of a shifting direction indicator of the current block according to a comparison result, wherein, the preset judgment result is obtained by judging whether a height of the current block is greater than a width of the current block.

3. The method of claim 1, wherein determining the value of a shifting direction indicator of the current block by using the preset model the based on size information and the angle index value of the current block further comprises:

using the angle index value to perform modulo operation on a sixth preset value to obtain a modulus result;

comparing the modulus result with a seventh preset value; and obtaining the value of a shifting direction indicator of the current block according to a result of comparison.

4. The method of claim 1, further comprising:

determining that a shifting direction of a dividing line of the current block at the angle is a horizontal direction if the value of a shifting direction indicator is equal to 1; and determining that a shifting direction of a dividing line of the current block at the angle is a vertical direction if the value of a shifting direction indicator is equal to 0.

5. The method of claim 1, wherein when the prediction mode parameter indicates that the Geometrical Partitioning Mode (GPM) is used for determining the inter prediction value of the current block, the method further comprises:

determining a partition mode of the current block; and determining the index value of the partition mode to be an index serial number corresponding to the partition mode in the preset mapping table and signaling the index value in a bitstream, wherein, the preset mapping table is used for determining a relationship between a partition mode index value, an angle index value and a distance index.

6. The method of claim 1, wherein performing inter prediction on the current block based on the value of a shifting direction indicator and the distance index value, comprises:

determining a target dividing line and offset information of the current block based on the value of a shifting direction indicator and the distance index value;

determining a first prediction value of a first partition of the current block and a second prediction value of a second partition of the current block based on division of the current block by the target dividing line;

calculating a weight matrix of the current block according to the offset information; and weighting pixel points in the current block using the first prediction value, the second prediction value and the weight matrix to obtain an inter prediction value of the current block.

7. A method for inter prediction, applied to a decoder, comprising:

decoding a bitstream to obtain a prediction mode parameter of a current block;

when the prediction mode parameter indicates that a Geometrical Partition Mode (GPM) is used for determining an inter prediction value of the current block, determining an angle index value and a distance index value, wherein, the angle index value and the distance index value represent index serial numbers corresponding to a dividing angle and a distance in the current block in a preset mapping table;

determining a value of a shifting direction indicator of the current block by using a preset model based on size information and the angle index value of the current block, wherein, the value of a shifting direction indicator is used for indicating shifting directions of different dividing lines of the current block at the angle; wherein the size information of the current block comprises a height and a width of the current block, and determining the value of a shifting direction indicator of the current block by using a preset model based on the size information and the angle index value of the current block comprises:

determining a first refinement value according to the angle index value;

obtaining a shifted height according to the first refinement value and the height of the current block;

obtaining a shifted width according to a preset offset value and the width of the current block; and obtaining the value of the shifting direction indicator of the current block according to a size of the shifted height and a size of the shifted width; and determining the inter prediction value of the current block based on the value of the shifting direction indicator and the distance index value.

8. The method of claim 7, wherein when the prediction Mode parameter indicates that the Geometrical Partition Mode (GPM) is used for determining the inter prediction value of the current block, the method further comprises:

decoding a bitstream to obtain a partition mode index value of the current block;

determining the angle index value and the distance index value comprises:

inquiring an angle index value and a distance index value corresponding to the partition mode index value from a preset mapping table based on the partition mode index value, wherein, the preset mapping table is used for determining a relationship between the partition mode index value, the angle index value and the distance index; and determining the inquired angle index value and distance index value as the angle index value and the distance index value.

9. The method of claim 7, wherein determining the value of a shifting direction indicator of the current block by using the preset model based on the size information and the angle index value of the current block further comprises:

searching for a shifting indication value corresponding to the angle index value from a second look-up table based on the angle index value;

comparing a searched-out shifting indication value with a preset judgment result; and obtaining the value of a shifting direction indicator of the current block according to a comparison result, wherein, the preset judgment result is obtained by judging whether a height of the current block is greater than a width of the current block.

10. The method of claim 7, wherein determining the value of a shifting direction indicator of the current block by using the preset model based on the size information and the angle index value of the current block further comprises:

using the angle index value to perform modulo operation on a sixth preset value to obtain a modulus result;

comparing the modulus result with a seventh preset value; and obtaining the value of a shifting direction indicator of the current block according to a result of comparison.

11. The method of claim 7, further comprising:
determining that a shifting direction of a dividing line of the current block at the angle is a horizontal direction if the value of a shifting direction indicator is equal to 1; and
determining that a shifting direction of a dividing line of the current block at the angle is a vertical direction if the value of a shifting direction indicator is equal to 0.

12. The method of claim 7, wherein determining the inter prediction value of the current block based on the value of a shifting direction indicator and the distance index value, comprises:
determining a target dividing line and offset information of the current block based on the value of a shifting direction indicator and the distance index value;
determining a first prediction value of a first partition of the current block and a second prediction value of a second partition of the current block based on division of the current block by the target dividing line;
calculating a weight matrix of the current block according to the offset information; and
weighting pixel points in the current block using the first prediction value, the second prediction value and the weight matrix to obtain an inter prediction value of the current block.

13. A decoder comprising a second memory and a second processor, wherein
the second memory is configured to store a computer program runnable on the second processor; and
the second processor is configured to perform the method of claim 7 when running the computer program.

* * * * *